(12) United States Patent
Kang

(10) Patent No.: US 11,625,708 B2
(45) Date of Patent: *Apr. 11, 2023

(54) SYSTEM AND METHOD FOR CUSTOMER INITIATED PAYMENT TRANSACTION USING CUSTOMER'S MOBILE DEVICE AND CARD

(71) Applicant: Soo Hyang Kang, Brea, CA (US)

(72) Inventor: Soo Hyang Kang, Brea, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/997,820

(22) Filed: Aug. 19, 2020

(65) Prior Publication Data

US 2020/0380495 A1    Dec. 3, 2020

Related U.S. Application Data

(63) Continuation-in-part of application No. 15/919,112, filed on Mar. 12, 2018, now Pat. No. 10,769,602.

(Continued)

(30) Foreign Application Priority Data

Jan. 3, 2017    (KR) .................. 10-2017-0000669

(51) Int. Cl.

| | |
|---|---|
| *G06K 19/06* | (2006.01) |
| *G06Q 20/32* | (2012.01) |
| *G06Q 20/34* | (2012.01) |
| *G06Q 20/40* | (2012.01) |
| *G06Q 20/20* | (2012.01) |

(Continued)

(52) U.S. Cl.
CPC ......... *G06Q 20/3278* (2013.01); *G06F 21/31* (2013.01); *G06K 7/10722* (2013.01); *G06K 7/1417* (2013.01); *G06Q 20/027* (2013.01);
*G06Q 20/10* (2013.01); *G06Q 20/202* (2013.01); *G06Q 20/204* (2013.01); *G06Q 20/206* (2013.01); *G06Q 20/326* (2020.05); *G06Q 20/3255* (2013.01); *G06Q 20/3276* (2013.01); *G06Q 20/352* (2013.01); *G06Q 20/3674* (2013.01); *G06Q 20/4097* (2013.01); *G06Q 20/40145* (2013.01); *G06Q 30/0185* (2013.01);

(Continued)

(58) Field of Classification Search
CPC .... G06Q 30/06; G06Q 30/0601; G06Q 20/20; G06Q 20/32
USPC ................... 235/451, 383, 385, 492, 472.02
See application file for complete search history.

(56) References Cited

U.S. PATENT DOCUMENTS

| | | | |
|---|---|---|---|
| 9,648,451 B1 | 5/2017 | Lee | |
| 9,760,871 B1 * | 9/2017 | Pourfallah | ......... G06Q 20/3276 |

(Continued)

FOREIGN PATENT DOCUMENTS

| | | |
|---|---|---|
| WO | 199849658 | 11/1998 |
| WO | 2017000061 | 1/2017 |
| WO | 2017021757 | 2/2017 |

*Primary Examiner* — Daniel St Cyr
(74) *Attorney, Agent, or Firm* — Heedong Chae; Lucem, PC

(57) ABSTRACT

A system for a customer-initiated payment transaction includes a mobile device of a customer and a payment card of the customer. The mobile device includes a mobile application or a digital wallet, on which a customer may register one or more of a plurality of payment methods. The mobile application or the digital wallet may be activated to establish a point-of-sale (OIS) system on the mobile device and include a process to authenticate the customer.

20 Claims, 34 Drawing Sheets

Related U.S. Application Data which is a continuation-in-part of application No. 15/703,841, filed on Sep. 13, 2017, now Pat. No. 10,769,612, which is a continuation-in-part of application No. 15/679,072, filed on Aug. 16, 2017, now abandoned, which is a continuation-in-part of application No. 15/665,333, filed on Jul. 31, 2017, now abandoned, said application No. 15/703,841 is a continuation-in-part of application No. 15/605,808, filed on May 25, 2017, now abandoned.

(51) Int. Cl.
*G06Q 20/36* (2012.01)
*G06Q 20/02* (2012.01)
*G06Q 30/018* (2023.01)
*G06Q 20/10* (2012.01)
*G06K 7/14* (2006.01)
*G06K 7/10* (2006.01)
*G06F 21/31* (2013.01)
*G06Q 20/06* (2012.01)

(52) U.S. Cl.
CPC ..... *G06Q 20/0655* (2013.01); *G06Q 2220/00* (2013.01)

(56) References Cited

U.S. PATENT DOCUMENTS

| | | | |
|---|---|---|---|
| 9,892,403 | B2 | 2/2018 | Fontaine |
| 9,977,890 | B2 | 5/2018 | Alberti |
| 10,769,612 | B2* | 9/2020 | Kang .................. G06Q 20/341 |
| 2011/0218871 | A1* | 9/2011 | Singh .................. G06Q 20/40 |
| | | | 705/17 |
| 2012/0150669 | A1 | 6/2012 | Langley |
| 2013/0024371 | A1 | 1/2013 | Hariramani |
| 2013/0097078 | A1 | 4/2013 | Wong |
| 2013/0097707 | A1 | 4/2013 | Ahnlab |
| 2013/0238455 | A1 | 9/2013 | Laracey |
| 2014/0019352 | A1 | 1/2014 | Shrivastava |
| 2014/0108166 | A1 | 4/2014 | Murphy |
| 2014/0136350 | A1 | 5/2014 | Savolainen |
| 2014/0257958 | A1 | 9/2014 | Andrews |
| 2014/0263627 | A1 | 9/2014 | Wyatt |
| 2015/0186871 | A1* | 7/2015 | Laracey .................. G06Q 30/06 |
| | | | 705/41 |
| 2016/0239694 | A1* | 8/2016 | Chin .................. G07C 9/00896 |
| 2016/0267486 | A1 | 9/2016 | Mitra et al. |
| 2018/0204195 | A1* | 7/2018 | Kang .................. G06Q 20/027 |

\* cited by examiner

FIG. 21
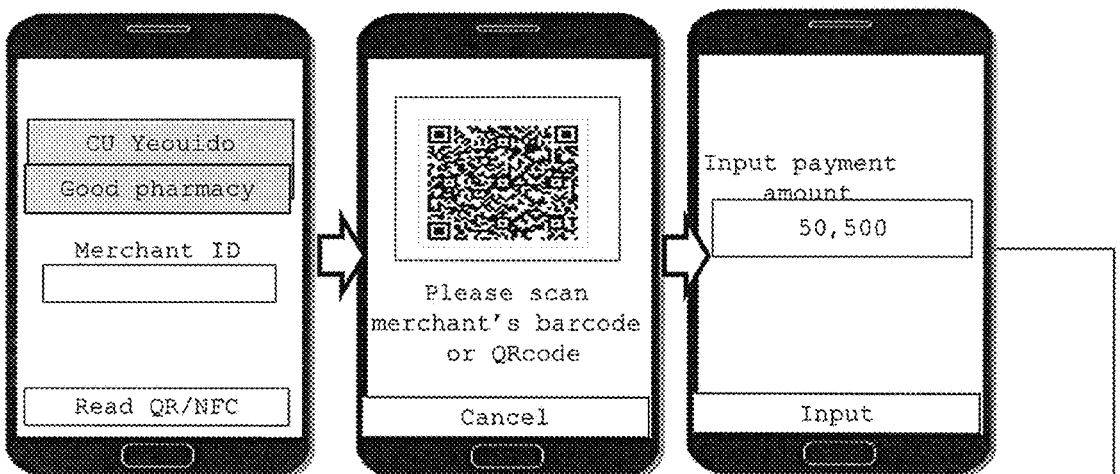
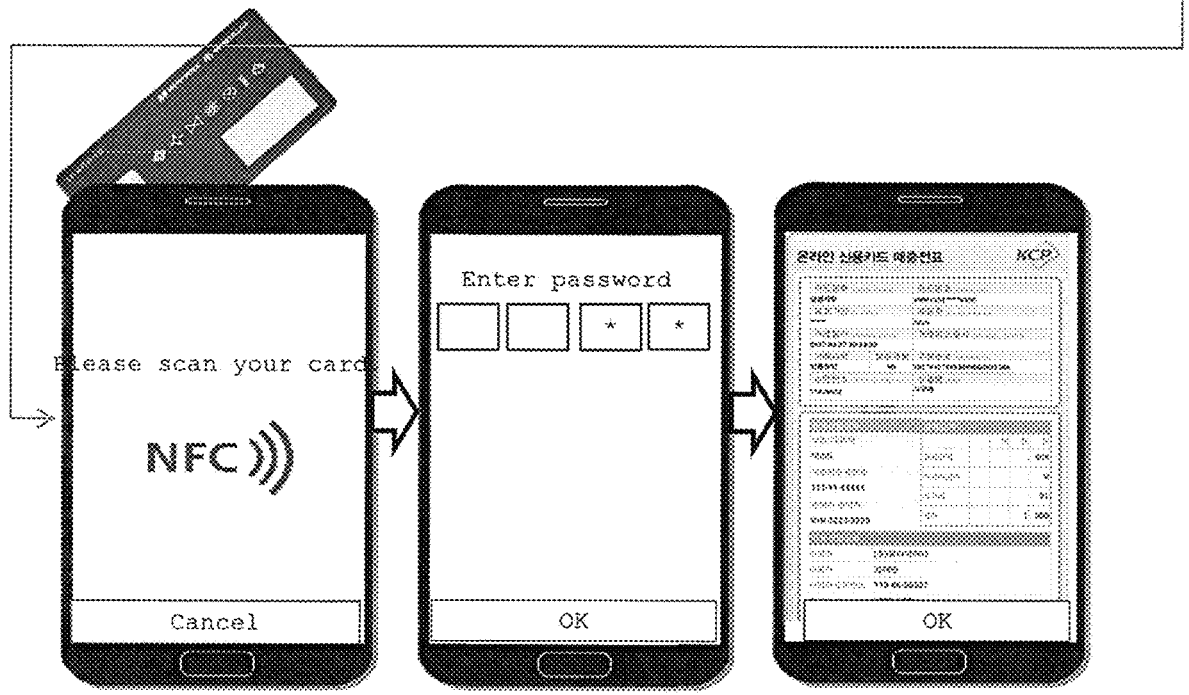

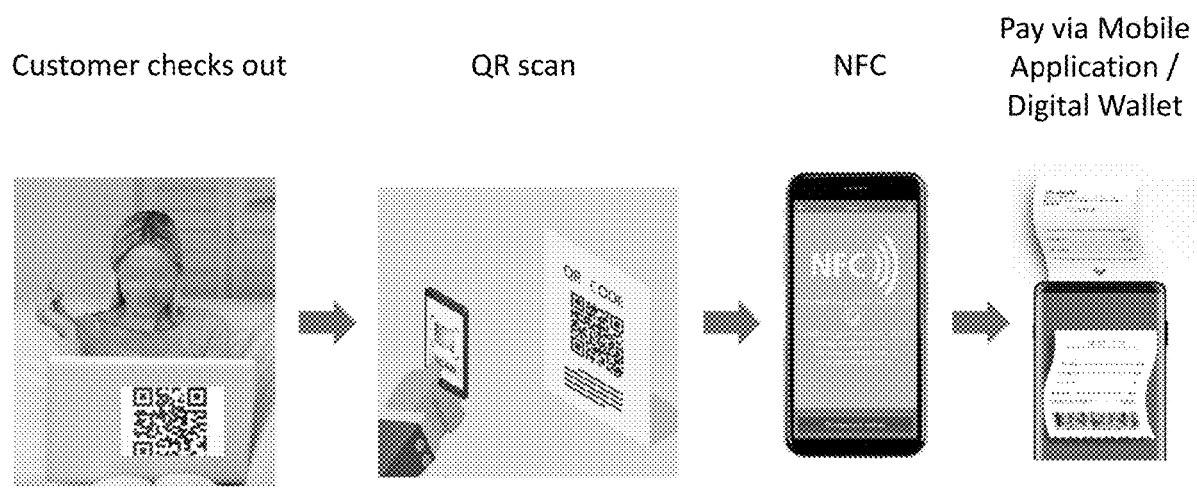
FIG. 33D
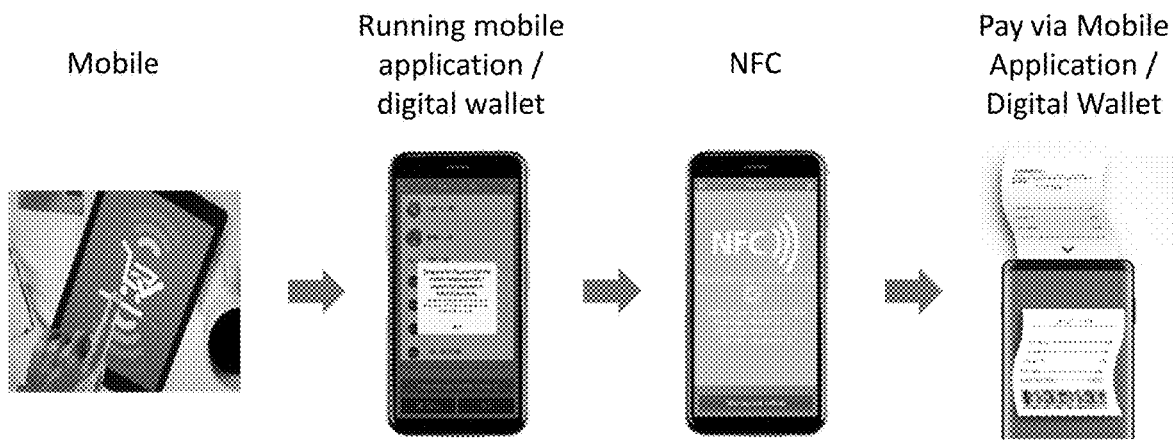

SYSTEM AND METHOD FOR CUSTOMER INITIATED PAYMENT TRANSACTION USING CUSTOMER'S MOBILE DEVICE AND CARD

CROSS-REFERENCE TO RELATED APPLICATIONS

This application is a continuation-in-part of and claims priority to U.S. patent application Ser. No. 15/919,112, filed on Mar. 12, 2018, which is a continuation-in-part of and claims priority to U.S. patent application Ser. No. 15/703,841, filed on Sep. 13, 2017, which is a continuation-in-part application of U.S. patent application Ser. No. 15/605,808, filed on May 25, 2017, which claims priority to Korean patent application no. 10-2017-0000669 filed on Jan. 3, 2017, and U.S. patent application Ser. No. 15/679,072, filed Aug. 16, 2017, which is a continuation-in-part of U.S. patent application Ser. No. 15/665,333 filed on Jul. 31, 2017, the disclosures of which are incorporated herein in their entirety by reference.

FIELD OF THE INVENTION

The present invention relates to a system for a payment transaction, and more particularly, to a system for a payment transaction initiated by a customer using the customer's mobile device having a mobile device or a digital wallet, which may be activated by a multi-function device card. The digital wallet communicates with a multi-payment gateway to request payment authorization through one or more payment methods, and the multi-payment gateway communicates with one or more customer accounts associated with the one or more payment methods to process the payment transaction. The payment methods may include a credit card, a debit card, a cryptocurrency, a loyalty points program, or the like.

BACKGROUND OF THE INVENTION

Payment cards (hereinafter "cards" or "card") are widely used by millions of people around the world to facilitate payments by electronic funds transfers. Payment cards may be a credit card, debit card, point card, multi-function device (MFD) card, near field communication (NFC) card, and so forth. A consumer may make a payment using his card to purchase a product or service from a merchant. In a typical case of purchase at a merchant's physical location as shown in FIGS. 1 and 2, the customer has to present his card at a point of sale (POS) terminal located at the merchant's place of business, the POS terminal typically owned and operated by the merchant. The customer inserts or swipes his card through the merchant's POS terminal. Alternatively, the required card information may be entered into the merchant's POS terminal or the merchant's POS terminal may accept near field communication contactless transactions and the card information is saved in the merchant's POS terminal. Once the card information is received and saved, the merchant's POS terminal transmits it to the acquirer for approval of the transaction along with the merchant information, such as a merchant code, and the transaction information, such as the payment amount and currency. The merchant's POS terminal transmits such information to the acquirer through the wired or wireless Internet communication or the standard telephone line. The acquirer communicates with the issuer as part of the approval process, where the issuer is the entity that issued the card to the consumer.

Here, an acquirer is usually a business entity such as a bank that has a pre-existing business relationship with a merchant. An issuer is usually a business entity such as a bank that issues a card to a consumer. The approval of the payment transaction or clearance and settlement thereof may involve communication between the acquirer and the issuer. The acquirer and/or issuer either approves or denies the payment transaction, and transfers such decision back to the merchant's POS terminal.

However, when a customer's card information is transferred to a merchant's POS terminal, there is a risk of the customer's card information being stolen. Additionally, if the merchant does not have a POS terminal or his POS terminal does not work, the customer cannot make a payment using his card.

Mobile devices such as a cellular phones, mobile phones, smart phones, tablet computing devices, personal digital assistants (PDAs), or the like, are becoming popular and being widely used as payment devices. The mobile device typically permits a device owner to make a payment for a merchant's goods or services. The mobile device may be linked to the device owner's payment account or the device owner's card information may be stored in the mobile device.

However, if the mobile device is stolen, the user of the mobile device may have access to the device owner's payment account or card information and be able to make payments without the device owner's approval.

A number of new payment systems have been introduced. Such systems typically utilize servers or management systems to manage the new payment transaction processes and databases. However, most systems drastically change existing payment transaction systems which makes it very expensive to implement and not practical.

Additionally, such systems do not provide a practical and flexible solution to customers and merchants desiring multiple methods of payment. For example, in recent years, cryptocurrency, in various forms such as Bitcoin, has emerged as a medium of exchange that provides a cryptographically secured decentralized alternative to traditional currencies and centralized electronic money. Cryptocurrency offers flexibility and privacy protection to users and may be implemented across a network of computing devices that maintains a digital ledger in the form of a block chain. Financial transactions using cryptocurrency may occur between a cryptocurrency wallet of a sender and a cryptocurrency wallet of a receiver. Such cryptocurrency wallets may store private and public keys that are necessary to authorize transfer of cryptocurrency.

Conventional payment systems and the new payment systems discussed above do not adequately provide for payment transactions using multiple payment methods such as cryptocurrency. Further, these systems do not provide for practical and easy-to-implement means for a customer to initiate payment and choose one or more forms of payment such as cryptocurrency, centralized currency, loyalty points, and the like.

Furthermore, with new and emerging methods threatening the security of e-commerce transactions, there exists a need to further improve security paradigms or protocols as the world of commerce is moving towards ecommerce.

Therefore, in order to overcome these disadvantages and shortcomings, there is a need for a system and method for a customer initiated payment transaction using a customer's mobile device that allows for multiple payment options to a customer as well as securely authorizing the customer based on certain conditions surrounding the payment transaction. This invention is directed to address the above problems and satisfy a long-felt need.

SUMMARY OF THE INVENTION

The present invention contrives to solve the disadvantages and shortcomings of the prior art by providing a system and method for customer initiated payment transactions using a customer's mobile device and card.

The object of the invention is to provide a system for a customer-initiated payment transaction, the system including a mobile device of a customer, the mobile device including a camera wherein the mobile device is constructed to enable near-field communication (NFC); a mobile application installed and operated in the mobile device; a quick read (QR) code of a merchant which includes merchant information; a server including a database; a payment card of the customer having card information wherein the payment card is constructed to enable NFC; and a payment information which includes a payment amount. The merchant information includes a merchant code. The mobile application is configured to use the camera of the mobile device to scan the QR code. The mobile application stored on the mobile device is operative to process a payment transaction which includes the steps of: receiving the merchant information; receiving the payment information from the merchant or the customer; initiating a process of authenticating the customer; activating the mobile application, by tapping or positioning the payment card about the mobile device for NFC between the payment card and the mobile device, such that the mobile application establishes the mobile device of the customer as a point-of-sale (POS) device to process the payment transaction, wherein the activating step includes the step of receiving the card information from the payment card; creating a payment authorization request using the card information, the merchant information, and the payment information, and sending the payment authorization request to an acquirer wherein the acquirer settles the payment authorization request with an issuer; clearing the card information from the mobile device after the mobile application sends the payment authorization request; and receiving a result of the payment authorization request from the acquirer and/or the issuer. The step of activating the mobile application further includes the step of transferring a chip serial number or a card serial number of the payment card from the payment card to the mobile device via NFC or Bluetooth Light Energy (BLE) communication such that the mobile application becomes activated and establishes the mobile device as the POS device upon the chip serial number or the card serial number from the payment card matching a chip serial number or a card serial number stored in the mobile device.

Another object of the invention is to provide a system for a customer-initiated payment transaction, the system including a mobile device of a customer including a camera wherein the mobile device is constructed to enable near-field communication (NFC); a digital wallet stored and operated in the mobile device; a multi-payment gateway affiliated with the digital wallet; a server including a database; and a payment card of the customer having card information wherein the payment card is constructed to enable NFC. The card information includes a chip serial number and a card serial number. A customer-initiated payment transaction includes the steps of: initiating a process to authenticate the customer; the payment card activating the digital wallet, by tapping or positioning the payment card about the mobile device for NFC between the payment card and the mobile device, such that the digital wallet establishes the mobile device as a point-of-sale device (POS) for processing the customer-initiated payment transaction, wherein the activating step includes the step of receiving the card information from the payment card; the digital wallet receiving merchant information and payment information from a merchant by the digital wallet communicating with the merchant via one of: NFC wherein the merchant provides an NFC tag comprising the merchant information and the payment information, and quick read (QR) code scanning by the camera wherein the merchant provides a QR tag comprising the merchant information and the payment information; the digital wallet receiving a payment method selection from the customer for payment; the digital wallet generating a payment authorization request based on the merchant information and the payment method selection; the digital wallet sending the payment authorization request to the multi-payment gateway; the multi-payment gateway directly or indirectly communicating to the merchant a result of the customer-initiated payment transaction; and the digital wallet receiving a result of the payment authorization request from the multi-payment gateway. The step of activating the digital wallet further includes the step of transferring the chip serial number, or the card serial number, from the payment card to the mobile device via NFC such that the digital wallet is activated if: the transferred chip serial number matches a chip serial number of the payment card stored in the mobile device, or the transferred card serial number of the card matches a card serial number of the payment card stored in the mobile device.

Yet another object of the invention is to provide a system for customer-initiated authentication, the system including a mobile device of a customer, the mobile device constructed to enable near-field communication (NFC); a mobile application installed and operated in the mobile device; a server including authentication information of the customer; and a payment card of the customer having card information wherein the payment card is constructed to enable NFC. The mobile application stored on the mobile device is operative to authenticate the customer which includes the steps of: activating the mobile application, by tapping or positioning the payment card about the mobile device for NFC between the payment card and the mobile device, such that the mobile application initiates a process of authenticating the customer; receiving the card information by transferring a chip serial number or a card serial number of the payment card from the payment card to the mobile device via NFC or Bluetooth Light Energy (BLE) communication; and clearing the card information from the mobile device after the processing step. The system is configured to generate an authentication result. The authentication information stored on the server includes a card information of the payment card.

The advantages of the present invention are: (1) a customer's payment transaction is possible even with the merchant's POS terminal or when a stand-alone POS terminal does not work; (2) sensitive customer's card information does not have to be transmitted to a merchant; (3) both the customer's mobile device and card are necessary for a payment transaction, and the mobile device does not store or log the card information, resulting in increased security; (4) merchants do not have to pay expensive card processing fees and the payment process becomes simplified; (5) the system of the present invention can get rid of the necessity of merchant POS terminals; (6) various cards such as debit/credit cards or loyalty point cards can be used as a payment method; (7) the system of the present invention utilizes pre-existing systems and does not drastically change such pre-existing systems, and thus it is easy to implement, effective, and saves costs; (8) the system of the present invention minimizes the impact to the existing payment processes and infrastructures such as the Europay (Trademark), Mastercard (Trademark) and Visa (Trademark; collectively EMV) standard; (9) a customer's mobile device plays the role of the merchant's POS terminal and thus, the customer's card information does not have to be disclosed to the merchant; (10) under the system of the present invention, security has been improved because the customer needs his card and mobile device to make a card payment and the mobile device does not store or log the card information except when it processes a payment request; (11) the system of the present invention provides even more improved security when the card is an MFD or NFC card and activated by the mobile device because even if the card is lost or stolen, it cannot be used unless activated by the mobile device; (12) the system of the present invention provides a multi-payment gateway, which facilitates payment by the customer to the merchant; (13) the system with the multi-payment gateway provides an easy-to-implement system that allows multiple payment options to the customer and merchant, including credit cards, debit cards, cryptocurrency, loyalty points, and the like; (14) the system may be implemented to provide a variety of shopping venues including online (PC and mobile) and offline merchants; (15) the system that includes a mobile application, a digital wallet, or the like can provide marketing services that promote the merchant's goods, even in real-time, on the customer's mobile device; (16) the system that includes a mobile application, a digital wallet, or the like can issue coupons/promos to the customer's mobile device, even in real-time; (17) the system can be device agnostic as it is developed to support a wide variety of mobile operating systems including the two of the most popular: iOS and Android; (18) the system is compatible with a wide variety of different payment platforms including (but not limited to) Samsung Pay, Google Pay, Apple Pay, Alipay, WeChat Pay, and the like; (19) the system can also include a software development kit (SDK) that that provides documentation and libraries to other applications installed on the mobile device to allow developers to use or integrate the features of the system into the other applications and platforms; and (20) the system that includes a mobile application, a digital wallet, or the like provides an additional security layer via a process of authenticating the customer during the customer-initiated payment transaction and further reduce occurrence of fraud during such payment transactions, where the authentication process may be within the system and/or the system may interface with other entities that also provide authentication services for additional layers of authentication, which thus improves security.

Although the present invention is briefly summarized, the fuller understanding of the invention can be obtained by the following drawings, detailed description, and appended claims.

BRIEF DESCRIPTION OF THE DRAWINGS

These and other features, aspects, and advantages of the present invention will become better understood with reference to the accompanying drawings, wherein:

FIG. 21 shows a process for an offline payment authorization using a mobile phone according to the present invention;

FIGS. 33A-F show processes for purchases via a mobile device platform according to the present invention.

DETAILED DESCRIPTION OF THE EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations by use of the word "about", it will be understood that the particular value forms another embodiment.

Figure 1:
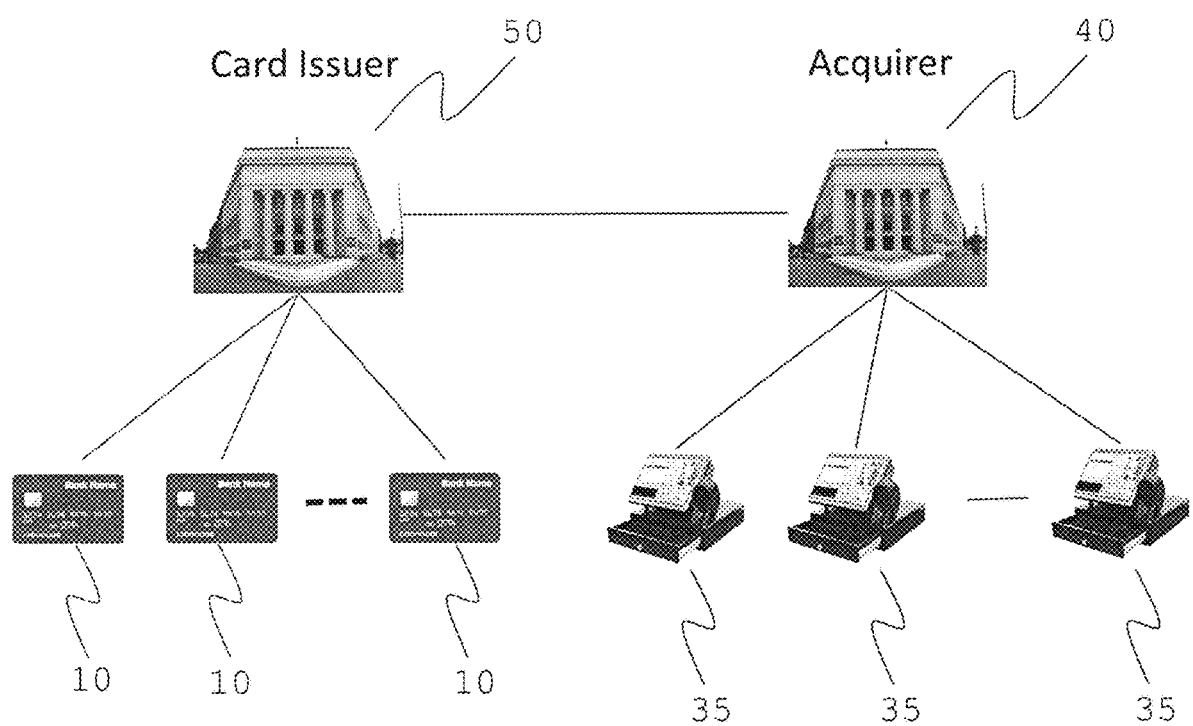
FIG. 1 is a schematic illustration of a conventional card payment transaction.
Figure 2:
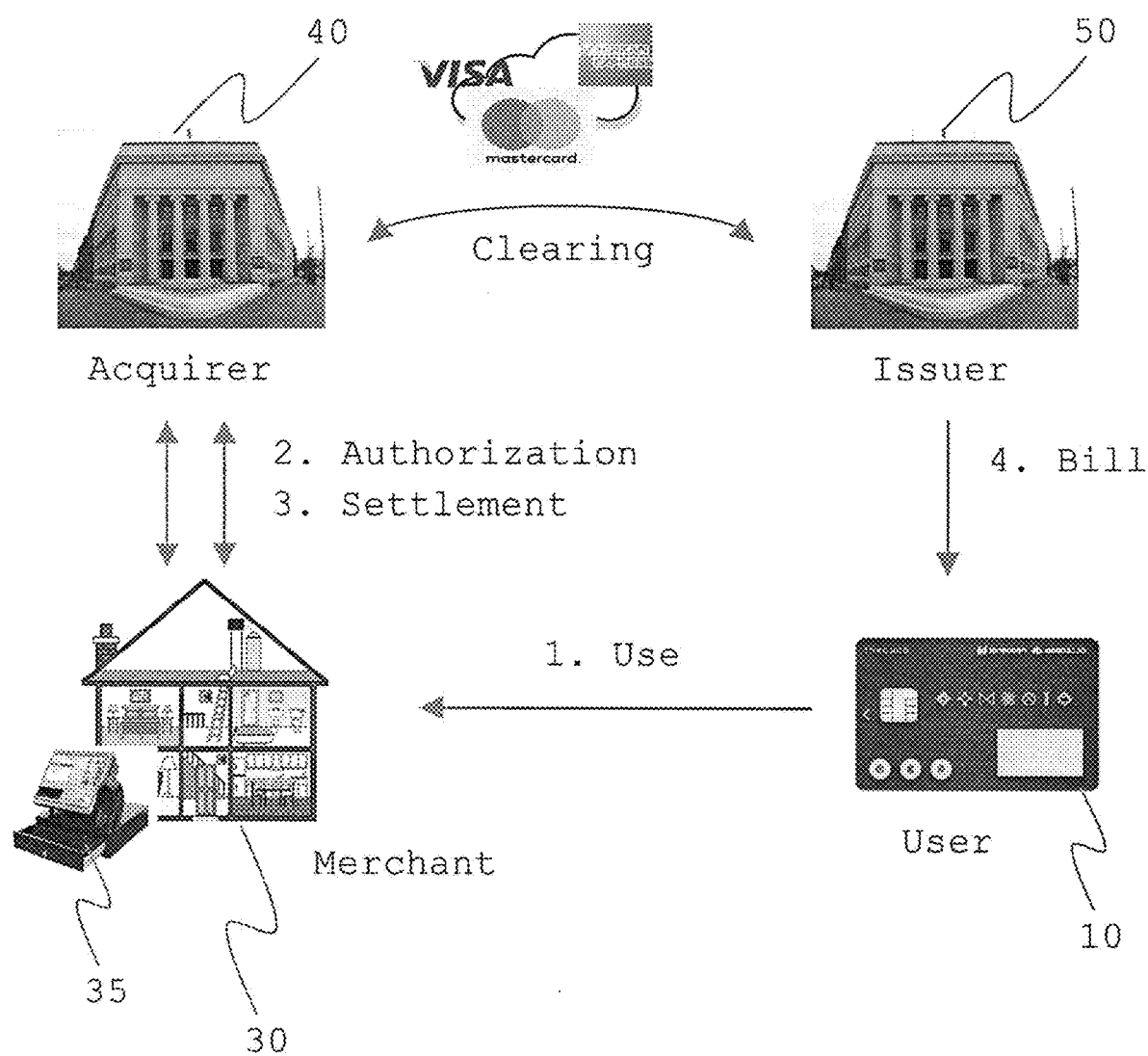
FIG. 2 is another schematic illustration of a conventional card payment transaction.

FIGS. 1 and 2 illustrate a conventional payment system using a merchant's point of sale (POS) terminal 35 and a customer's card 10 such as a credit/debit card, a point card, a loyalty point card, a multi-function device (MFD) card, a near field communication (NFC) card, digital card, dual interface card or radio frequency (RF) card, or the likes.

A consumer may make a payment using his card 10 to purchase a product or service from a merchant. The customer presents his card 10 at a point of sale (POS) terminal 35 located at a merchant's place of business 30; the POS terminal 35 being typically owned and/or operated by the merchant. The card 10 is inserted or swiped through the POS terminal 35. Alternatively, the required card information may be entered by the merchant or the POS terminal 35 may accept near field communication contactless transactions from the card 10. The card information is then saved in the POS terminal. Once the card information is received and saved, the POS terminal 35 transmits it to the acquirer 40 for approval of the transaction along with the merchant information, such as a merchant code, and the transaction information, such as the payment amount and currency. The merchant code is an identification assigned to the merchant for card transaction. The POS terminal 35 transmits such information to the acquirer 40 through the wired or wireless Internet communication or the standard telephone line. The acquirer 40 communicates with the issuer 50 as part of the approval process, where the issuer 50 is the entity that issued the card 10 to the consumer.

Here, an acquirer 40 is usually a business entity such as a commercial bank that has a pre-existing business relationship with a merchant and an issuer 50 is usually a business entity such as a bank that issues a card 10 to a consumer. The approval of the payment transaction or clearance and settlement thereof may involve communication between the acquirer 40 and the issuer 50. The acquirer and/or issuer either approves or denies the payment transaction, and transfers such decision back to the POS terminal 35.

Figure 3:
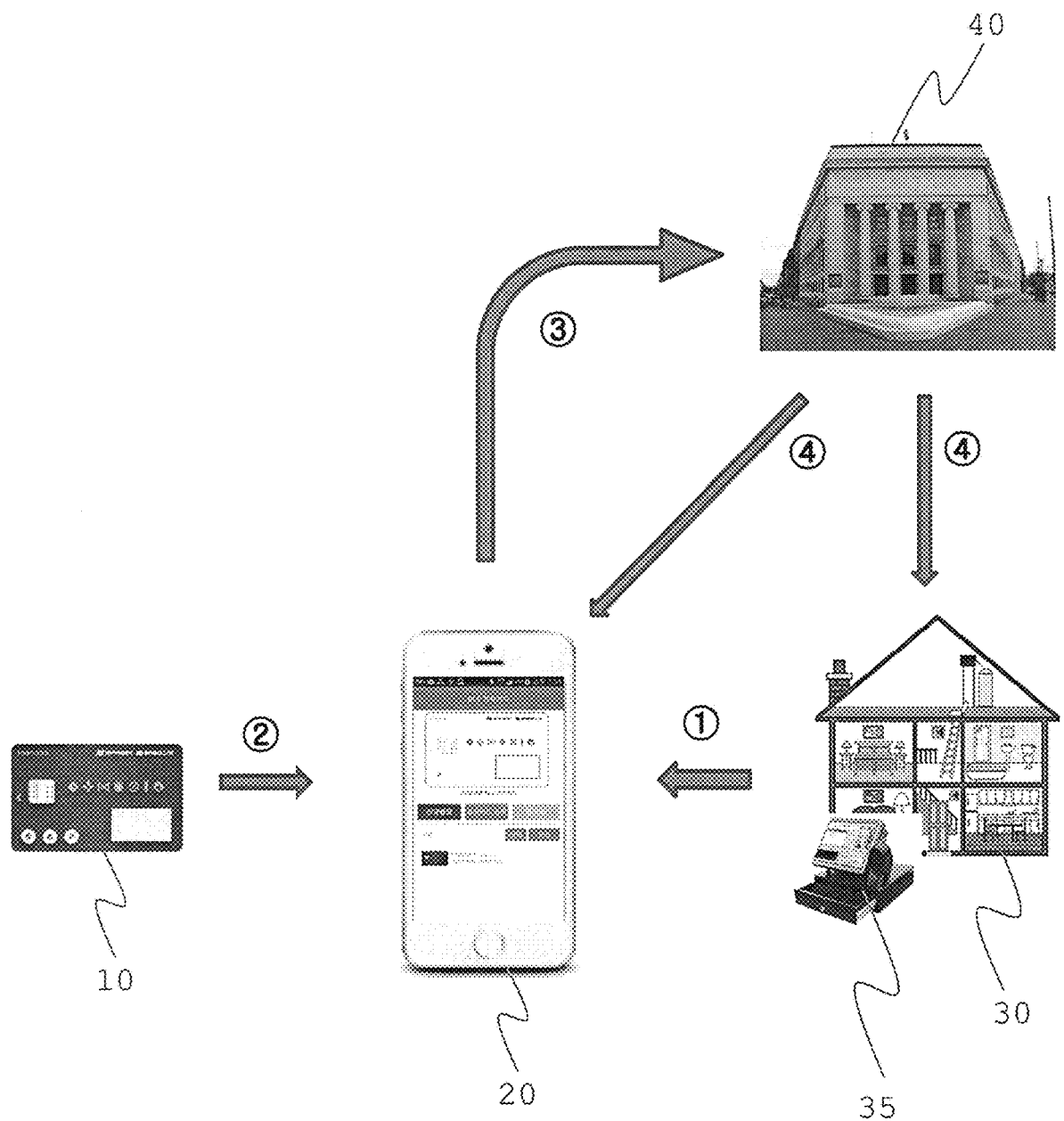
FIG. 3 is a schematic illustration of a card payment transaction using customer's mobile device and card according to the present invention.
Figure 4:
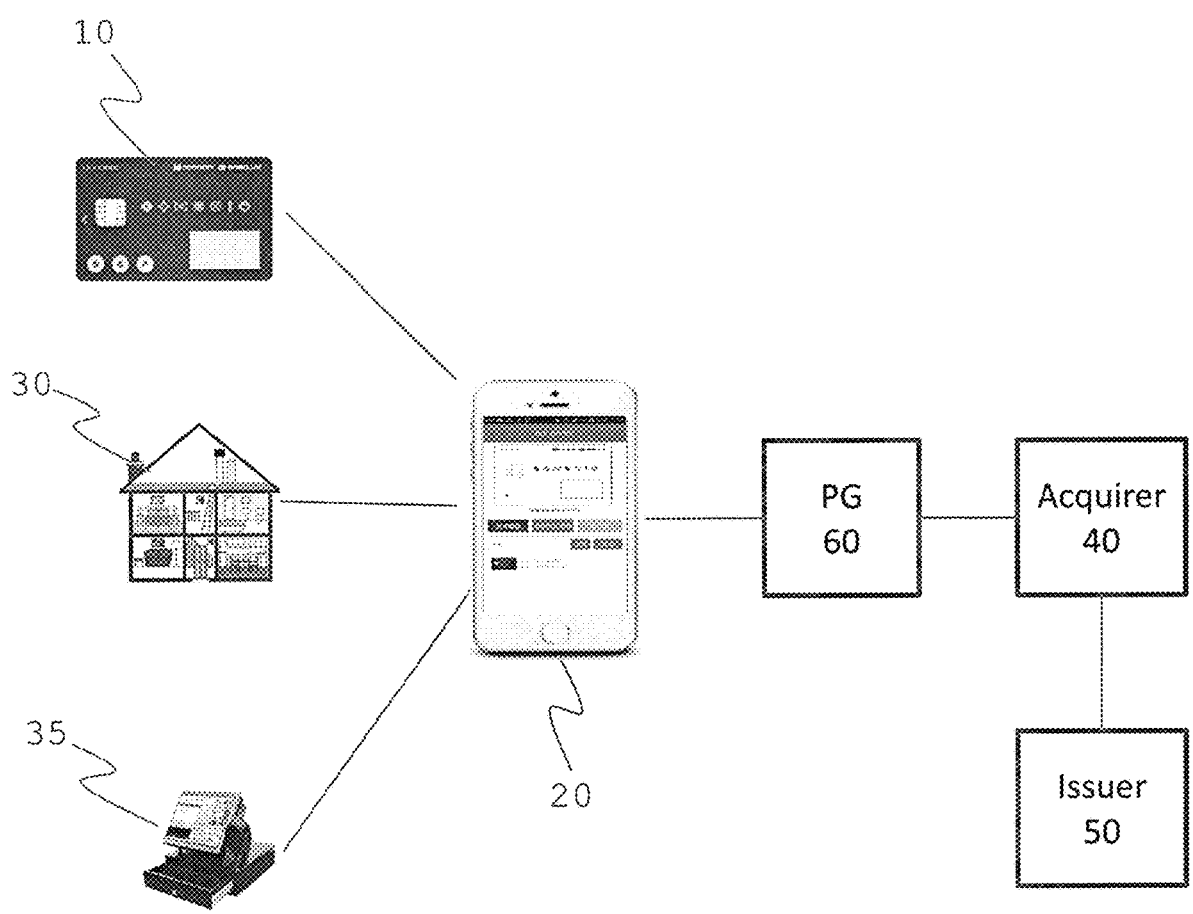
FIG. 4 is another schematic illustration of the card payment transaction using customer's mobile device and card according to the present invention.
Figure 5:
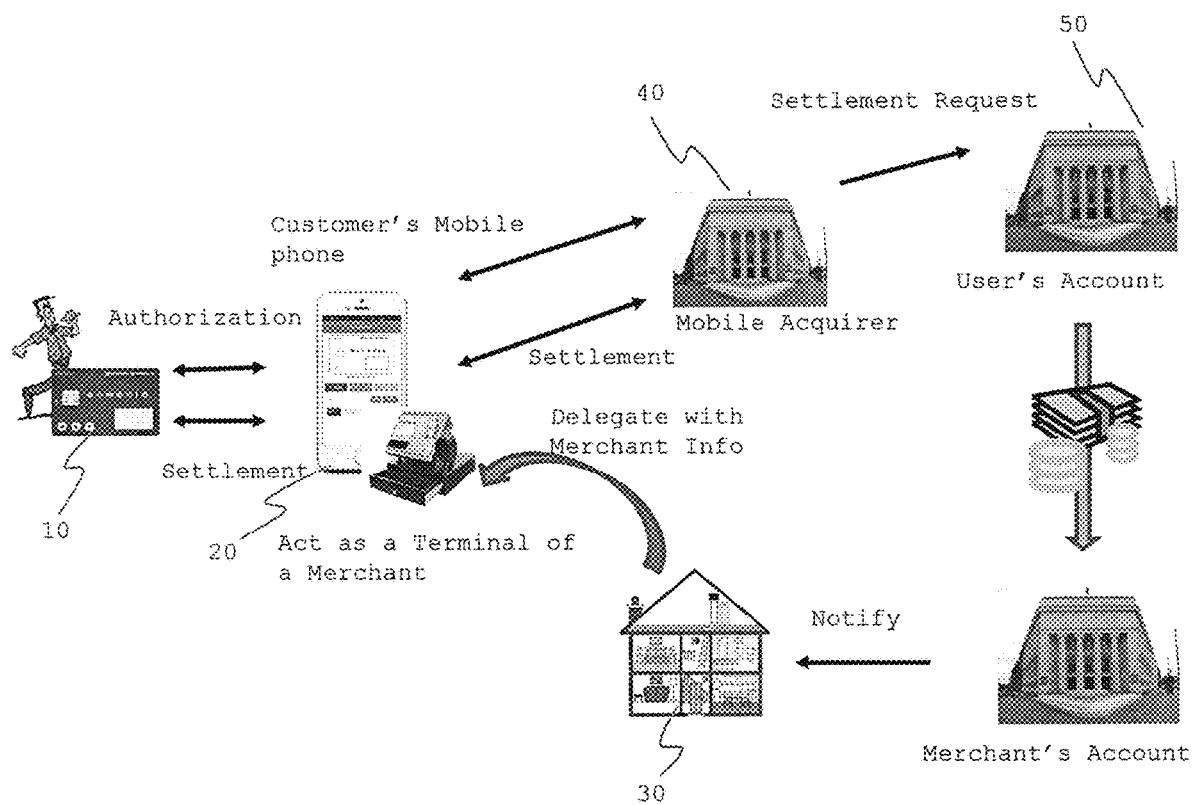
FIG. 5 is still another schematic illustration of the card payment transaction using customer's mobile device and card according to the present invention.

FIGS. 3, 4 and 5 illustrate the system for a customer initiated payment system using customer's card 10 and mobile device 20 according to the present invention.

The system for a customer initiated payment transaction includes a mobile device 20 of a customer; a card 10 of the customer having card information; and a merchant having merchant information and payment information. The merchant information may include a merchant code and the merchant's POS or other terminal parameter, and the payment information includes a payment amount, currency, or transaction number that the customer has to pay to purchase goods or services of the merchant.

The mobile device 10 may be a cellular phone, mobile phone, smart phone, tablet computing device, personal digital assistant (PDA), or the like. Here, the mobile device 10 also includes the application installed therein to implement the system of the present invention.

The acquirer 40 communicates with the issuer 60 as part of the approval process, where the issuer 60 is the entity that issued the card 10 to the consumer. Here, an acquirer 40 is usually a business entity such as a commercial bank that has a pre-existing business relationship with a merchant and an issuer 60 is usually a business entity such as a bank that issues a card 10 to a consumer. The approval of the payment transaction or clearance and settlement thereof may involve communication between the acquirer 40 and the issuer 60. The acquirer 40 and/or issuer 60 either approves or denies the payment transaction, and transfers such decision back to the mobile device 20. As in FIG. 4, the system may further include a payment gateway 60.

The mobile device 20 is operative to process a card payment transaction by the steps of, the mobile device 20: receiving the merchant information and the payment information; being activated, for processing the card payment transaction, by the card 10; creating a payment authorization request using the card information, the merchant information, and the payment information, and sending the payment authorization request to an acquirer 40; and receiving a result of the payment authorization request from the acquirer 40.

Here, the step of the mobile device 20 being activated includes not just activation for processing the card payment transaction but also authorization to use the card by the mobile device. Such activation, including authorization, may be accomplished in different ways: NFC or Bluetooth (Trademark) communication between the card and the mobile device, typing the card information into the mobile device 20, etc. Such activation may additionally include typing password or matching finger print or the likes.

Additionally, the step of the mobile device 20 being activated may be performed before the step of the mobile device 20 receiving the merchant information and the payment information.

The result of the payment authorization request may be approval or denial of the card payment, and such result is transmitted and displayed on the mobile device.

Figure 6:
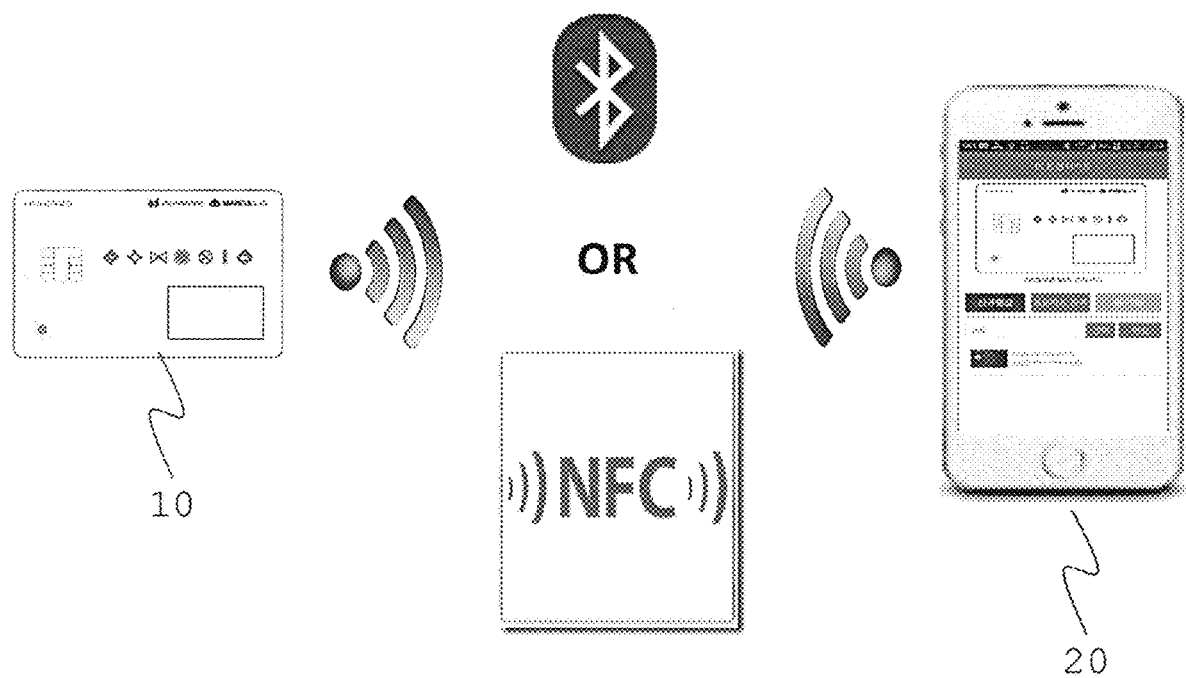
FIG. 6 shows communication methods between a card and a mobile device for a card payment transaction according to the present invention.

FIG. 6 shows the communication between the customer's card 10 and the customer's mobile device 20. Such communication is preferably by Bluetooth (Trademark) or near field communication. Or, the card information may be typed in the mobile device 20.

Preferably, the card 10 may be a multi-function device (MFD) card or a near field communication (NFC) card having an antenna for near field communication (NFC), and the mobile device 20 may include an NFC sensor. The NFC card may have dual interface or may be a contactless card. The mobile device 20 may be activated for processing the card payment transaction via NFC between the card 10 and the mobile device 20, and the mobile device 20 may receive the card information from the card 10 via NFC between the card and the mobile device. In other words, by tapping the card 10 to the mobile device 20, the mobile device 20 is activated for processing a card payment transaction and receives the card information.

The card 10 may be the MFD card which stores information on a plurality of different cards, and the customer may select a card to be used for the card payment transaction from the list of the plurality of different cards using the MFD card. Alternatively, the card 10 may be the MFD card which stores information on a plurality of different cards, and the customer may select a card to be used for the card payment transaction from a list of the plurality of different cards using the mobile device. In other words, an MFD card can store a number of debit/credit cards and/or point cards together and a user can select which card to be used as a payment means. The MFD card may have a display such that the user can select a card from the list of cards displayed on the MFD card. Alternatively, such list may be transferred to the mobile device 20 and displayed on the screen of the mobile device 20 so that the user can select a card from the list.

The steps may further include the step of activating the card 10 such as the MFD card or NFC card via NFC or Bluetooth Light Energy (BLE) communication between the mobile device 20 and the card 10. For the BLE communication, the card 10 may have a BLE chip and the mobile device 20 may have a BLE antenna. Upon activation, the card can be used for payment transactions. U.S. patent application Ser. No. 15/605,808, entitled "Method for Activating Multi-Function Device Card", discloses method for activating the MFD card using the mobile device, the disclosure of which is incorporated herein in its entirety by reference.

The step of activating the card 10 may be performed before the step of the mobile device 20 receiving the merchant information and the payment information.

The method for activating an MFD card 10 by a mobile device 20 includes: switching on an NFC chip of the mobile device 20 to enable the mobile device 20 to wirelessly connect to the MFD card 10 via an NFC network; searching with the mobile device 20 in the NFC network for the MFD card 10 within a communicable range of the mobile device 20 by transmitting NFC signal from the mobile device 20 to the MFD card 10 to enable electromagnetic induction in an NFC antenna of the MFD card 10; launching on the mobile device 20 a preloaded application for initiating MFD card activation if the MFD card 10 is discovered via the NFC network; connecting the mobile device 20 to the MFD card 10 by a wireless personal area network (WPAN) using a WPAN antenna and WPAN chip of the MFD card 10 upon launching the preloaded application for initiating MFD card activation on the mobile device 20; mutually authenticating the MFD card 10 and the mobile device 20 through the WPAN by a predetermined method by the application; and when the MFD card 10 is authenticated, completing activation of the MFD card 10 for use. Preferably, the WPAN connection is a Bluetooth Low Energy (BLE) connection enabled by a BLE antenna and a BLE chip of the MFD card 10 and corresponding BLE antenna and BLE chip of the mobile device 20. Since the card 10 is activated by the mobile device 20, even if it is lost, it cannot be used for payment transactions without the mobile device 20.

The step of the mobile device 20 being activated includes transferring a chip serial number or a card serial number of the card 10 from the card 10 to the mobile device 20, and the mobile device 20 is activated for processing the card payment transaction if or only if the transferred chip serial number or the transferred card serial number matches the chip serial number or the card serial number stored in the mobile device 20.

The steps may further include a step of the mobile device receiving the card information. The card information may be received via NFC or Bluetooth communication or typed into the mobile device 20.

For security reasons, the card number or the card information is not stored in the mobile device 20 before the step of the mobile device 20 being activated. Furthermore, the steps further include the step of the mobile device 20 deleting the card information after sending the payment authorization request to the acquirer 40.

The steps may further include the step of the mobile device 20 creating and sending a clearance and settlement request to the acquirer 40. In other words, the mobile device 20 sends two requests: the payment authorization request and the clearance and settlement request. By these two separate requests, customers can have better control over the merchant's production of the goods or services.

Figure 7:
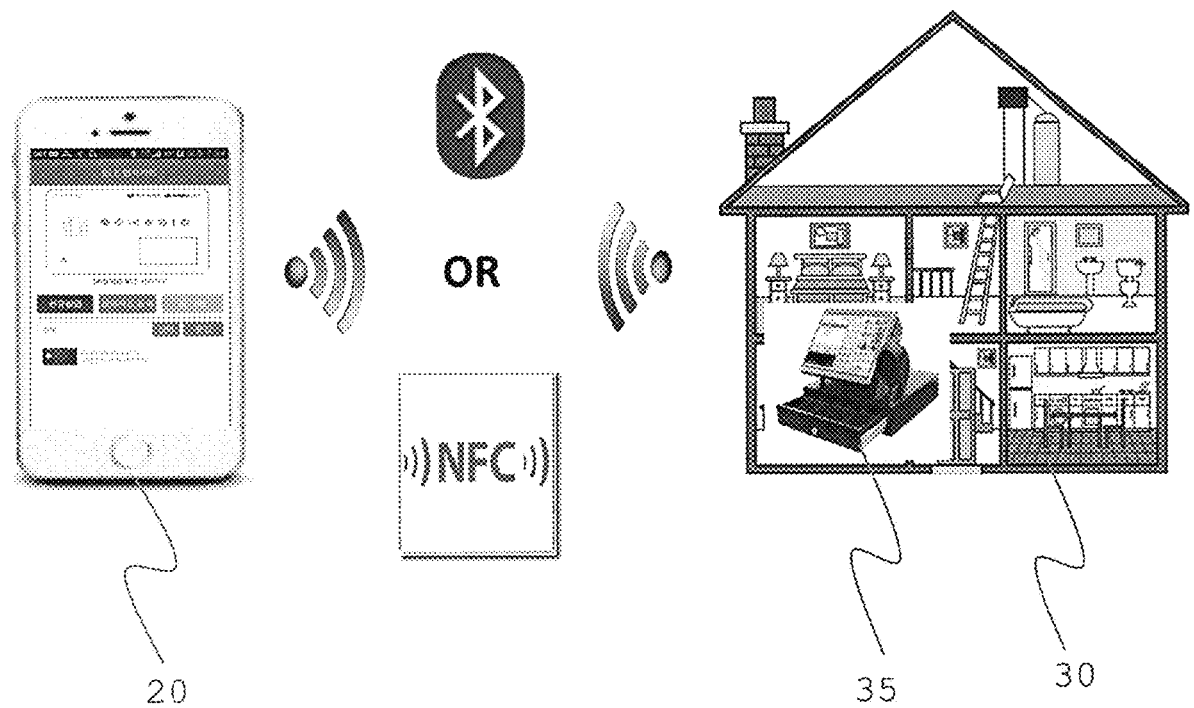
FIG. 7 shows communication methods between a card and a merchant or its POS terminal for the card payment transaction according to the present invention.

FIG. 7 illustrates the communication between the mobile device 20 and the merchant 30 or its POS terminal 35.

The mobile device 20 may receive the merchant information from the merchant by: wireless communication from the merchant; tapping the mobile device 20 to an NFC tag or RFID tag of the merchant which stores the merchant information; or typing the merchant information to the mobile device 20 either by the customer or the merchant. Additionally, SMS, beacon, infrared communication may be used. Alternatively, the merchant may use QR code or bar code to store and transmit the merchant information.

In the alternative embodiment, the system may further comprise a server having a database which stores the merchant information. The mobile device 20 may obtain geolocation data of the merchant using a global positioning sensor (GPS) of the mobile device 20 and sends the geolocation data to the server, and in response, the server searches for and retrieves the merchant information corresponding to the geolocation data and sends the merchant information back to the mobile device 20.

In one embodiment, the system may utilize a proprietary portal database to retrieve the merchant information. The customer can retrieve detailed merchant information using the proprietary system, using for example GPS location of the merchant's place of business. The database may be updated from information gathered from participant users. The mobile device 20 may send the GPS location of the merchant and receive the merchant information from the proprietary merchant information provision system, or the mobile device 20 may send the GPS location or the merchant ID to the proprietary merchant information provision system and the proprietary merchant information provision system may send the merchant information back to the mobile device 20.

Besides, the mobile device 20 may receive the payment information from the merchant by: wireless communication from the merchant; tapping the mobile device to an NFC tag or RFID tag of the merchant which stores the payment information; or typing the payment information to the mobile device 20 either by the customer or the merchant. Additionally, SMS, beacon, infrared communication may be used. Alternatively, the merchant may use QR code or bar code to store and transmit the payment information.

The steps may further include a step of the acquirer 40 sending the result of the payment authorization request to the merchant via short message service (SMS), email, push message to the merchant terminal, etc.

Figure 8:
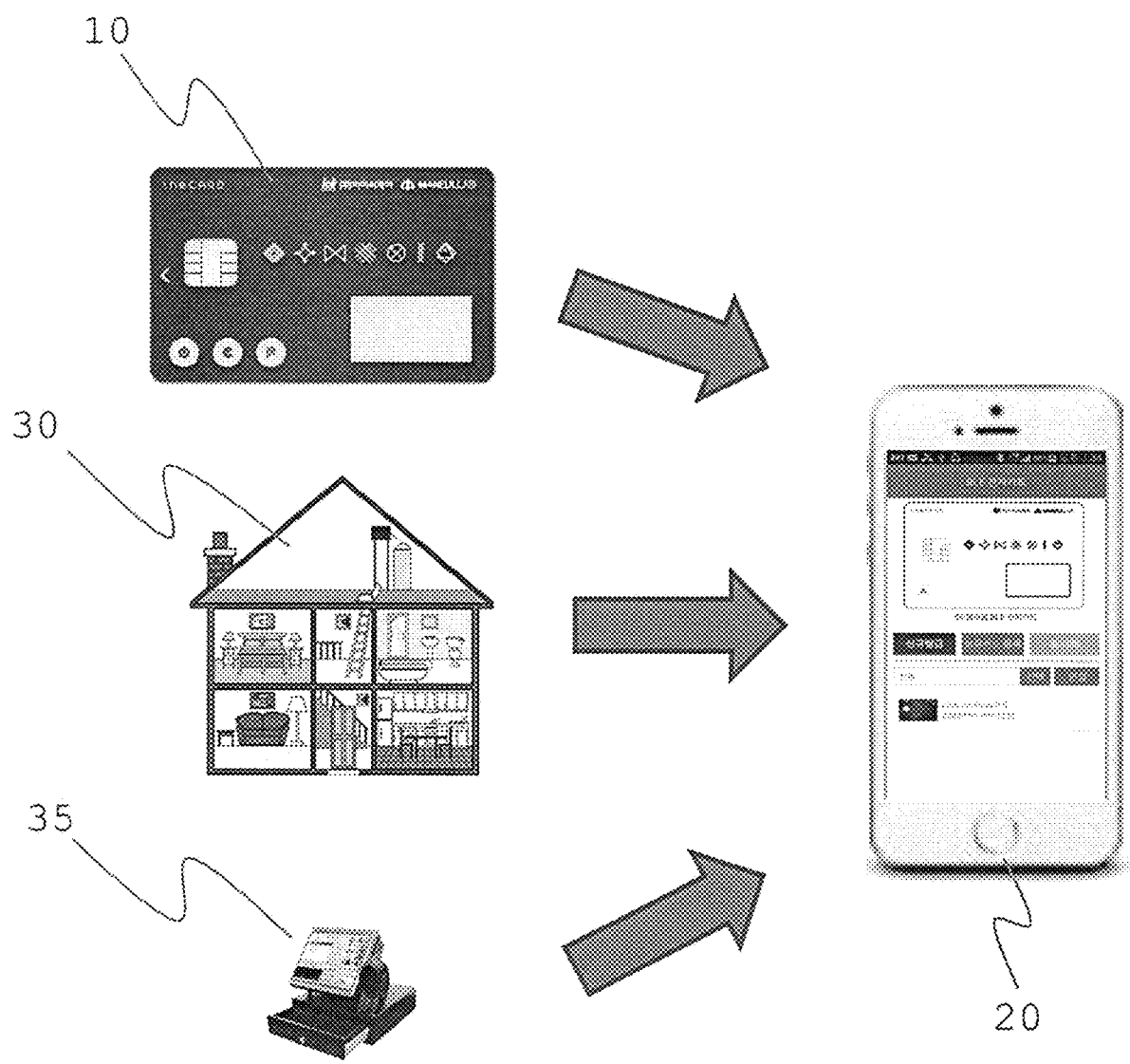
FIG. 8 shows a communication between customer's mobile device and a card, a merchant or the merchant's POS terminal according to the present invention.

As shown in FIG. 8, the mobile device 20 communicates with the card 10, the merchant 30, or the merchant's POS terminal, and plays the role of customer's own POS terminal.

FIGS. 3, 4 and 5 illustrate the system for a customer initiated payment system using customer's card 10 and mobile device 20 according to the present invention. The card 10 may be debit/credit card, but it can be point card as well. U.S. patent application Ser. No. 15/679,072, entitled "System and Method for Integrated Management of Loyalty Points", discloses a method to convert non-integrated loyalty points to integrated loyalty points, the disclosure of which is incorporated herein in its entirety by reference.

The system for a customer initiated payment transaction according to the present invention includes: a mobile device 20 of a customer; a card 10 of the customer having information on integrated loyalty points; and a merchant who subscribes to accept integrated loyalty points as a payment method. The merchant has merchant information and payment information, and the information on the integrated loyalty points includes customer identification and the amount of the integrated loyalty points owned by the customer. The merchant information includes a merchant code and the payment information includes a payment amount.

The mobile device 20 is operative to process a payment transaction using the integrated loyalty points of the customer by the steps of, the mobile device 20: receiving the merchant information and the payment information, for instance, from the merchant; being activated, for processing the payment transaction, by the card 10; creating a payment authorization request using the information on the integrated loyalty points, the merchant information, and the payment information, and sending the payment authorization request to an acquirer 40 for the integrated loyalty points; and receiving a result of the payment authorization request from the acquirer 40.

The system may further include an integrated management server for managing the integrated loyalty points.

Preferably, the card 10 may be a multi-function device (MFD) card or a near field communication (NFC) card having an antenna for near field communication (NFC), and the mobile device 20 may include an NFC sensor. The mobile device 20 may be activated for processing the payment transaction via NFC between the card 10 and the mobile device 20, and the mobile device 20 may receive the information on the integrated loyalty points from the card 10 via NFC between the card 10 and the mobile device 20.

For better security, the information on the integrated loyalty points may not be stored in the mobile device 20 before the step of the mobile device 20 being activated. In addition, the steps may further include the step of the mobile device 20 deleting the information on the integrated loyalty points after sending the payment authorization request to the acquirer 40.

The mobile device 20 may receive the merchant information and/or the payment information from the merchant by: wireless communication from the merchant; tapping the mobile device 20 to an NFC tag of the merchant which stores the merchant information; or typing the merchant information to the mobile device 20 either by the customer or the merchant. Additionally, SMS, beacon, infrared communication may be used. Alternatively, the merchant may use QR code or bar code to store and transmit the merchant or payment information.

The steps may further include a step of the acquirer 40 sending the result of the payment authorization request to the merchant via SMS, email, push message to the merchant terminal, etc.

In still another embodiment, a method for a customer initiated payment transaction using the customer's card 10 is disclosed. The method includes the steps of customer's mobile device 20: receiving the merchant information and the payment information, for instance, from the merchant; being activated, for processing a card payment transaction, by customer's card 10; creating a payment authorization request using card information, the merchant information, and the payment information, and sending the payment authorization request to an acquirer 40; and receiving a result of the payment authorization request from the acquirer 40. The method further includes the step of the mobile device deleting the card information after sending the payment authorization request to the acquirer 40.

In still another embodiment, a method for a customer initiated payment transaction using the customer's integrated loyalty points, which are stored in the customer's card 10, is disclosed. The method includes the steps of the customer's mobile device 20: receiving the merchant information and the payment information, for instance, from the merchant; being activated, for processing the payment transaction, by the customer's card 10; creating a payment authorization request using the information on the integrated loyalty points, the merchant information, and the payment information, and sending the payment authorization request to an acquirer 40 for the integrated loyalty points; and receiving a result of the payment authorization request from the acquirer 40. The method further includes the step of the mobile device 20 deleting the information on the integrated loyalty points after sending the payment authorization request to the acquirer 40.

Under the typical purchase situations using the system of the present invention, a customer enters a merchant's place of business and purchases goods or services of the merchant. The customer's mobile device 20 receives the merchant information and the payment information. The customer may activate his MFD card or NFC card 10 via BLE or NFC by tapping it to his mobile device 20, and then the customer may select one of the stored payment methods—credit/debit cards or (integrated or non-integrated loyalty) point cards— from the screen of the mobile device 20. Then, the mobile device 20 creates and sends a payment authorization request to an acquirer, and then the acquirer sends the authorization result back to the mobile device 20 and the merchant.

The system of the present invention may be additionally used for escrow situations. The customer may separate the payment process into two: sending a payment authorization request to an acquirer and sending a clearance and settlement request to an acquirer. Between the two steps, the customer can monitor and make sure whether the merchant fulfills certain requirements or obligations.

Figure 9:
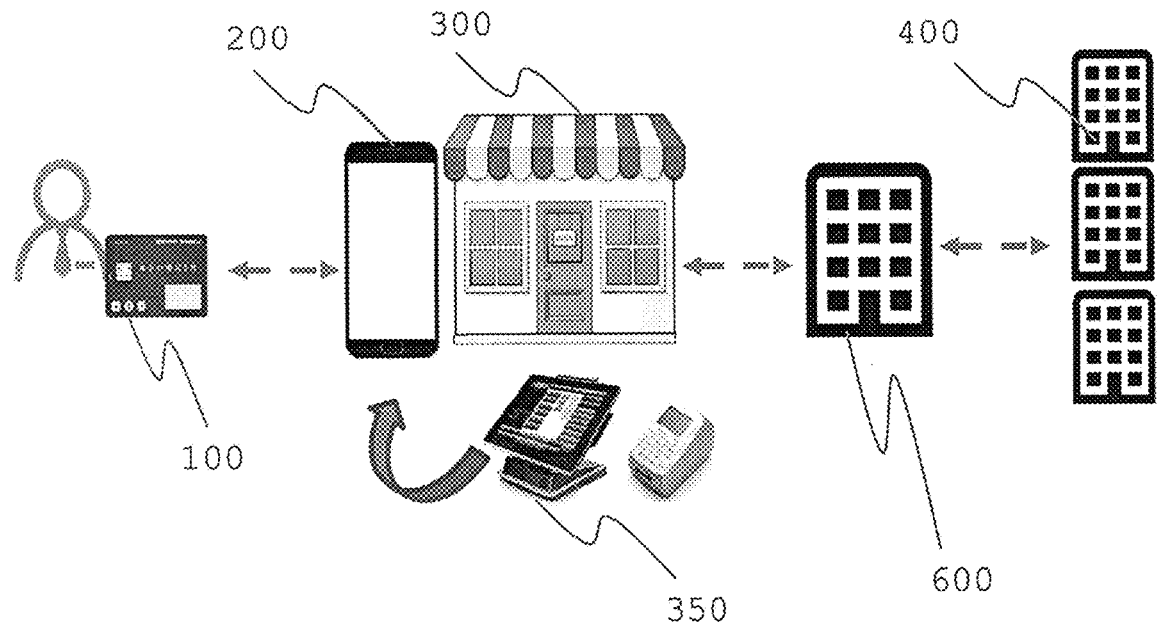
FIG. 9 shows a system for a merchant initiated payment transaction using a customer's mobile device.
Figure 10:
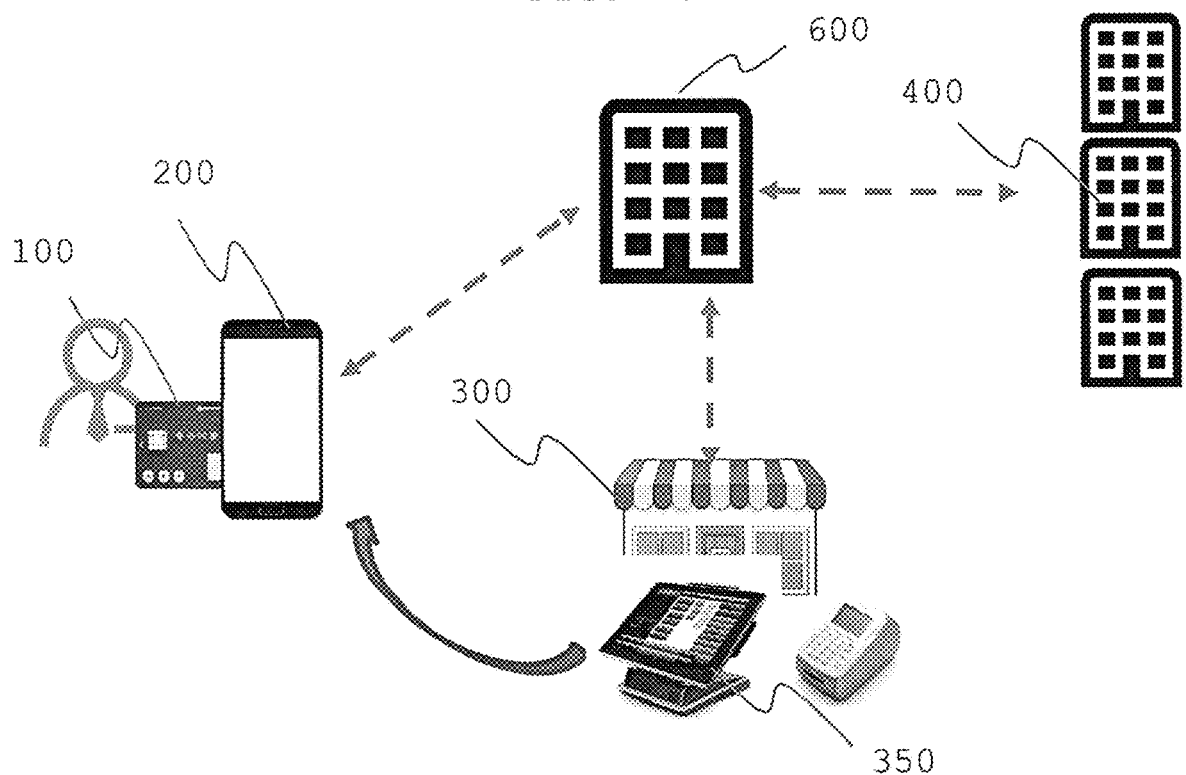
FIG. 10 shows a system for a customer initiated payment transaction according to the present invention.
Figure 11:
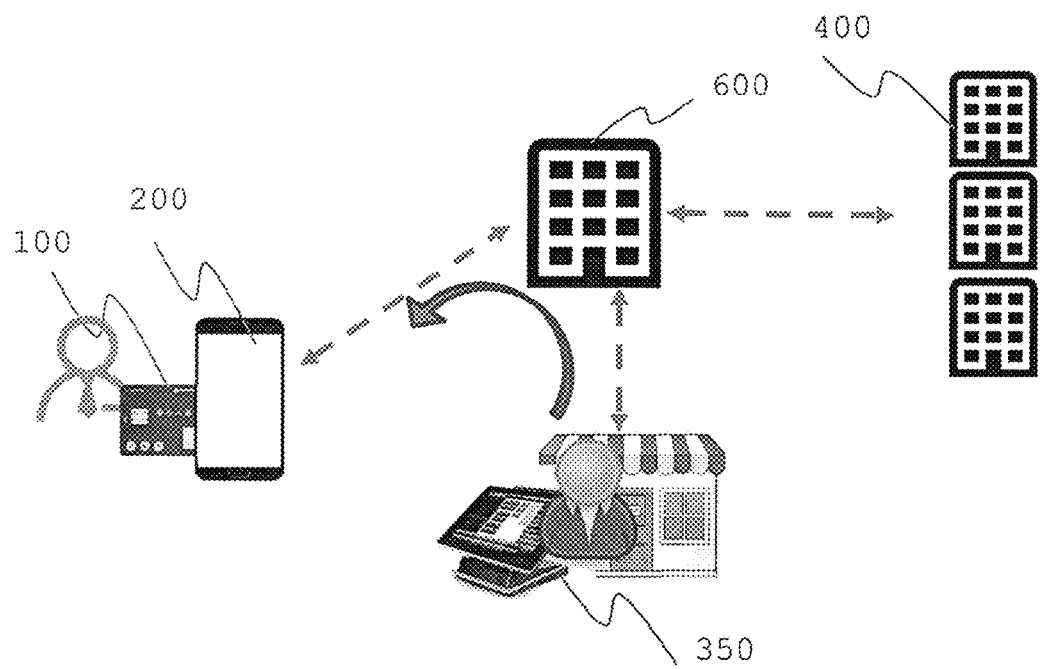
FIG. 11 shows a system for a customer initiated payment transaction according another embodiment of the present invention.

FIGS. 9, 10, and 11 show payment transaction systems according to the present invention that incorporate a customer initiated mobile terminal (CIMT) portal 600. The CIMT portal 600 may include one or more servers that facilitate payment from a mobile device 200 to a merchant 300 through multiple payment methods. The CIMT portal 600 may be alternatively described as a multi-payment gateway. As shown in FIG. 9, a customer having a payment card 100 may make a payment to a merchant 300 using a mobile device 200. In the system illustrated in FIG. 9, the merchant 300 may initiate the payment transaction on the mobile device 200 of the customer in as an alternative to using a separate point-of-sale (POS) device 350. The payment transaction may further include a step of the mobile device 200 requesting payment to the CIMT portal 600. Additionally, the CIMT portal 600 may request payment to a payment vendor 400. Such a payment vendor 400 may have a role similar to the acquirer and issuer described above and may be a business entity such as a bank, a cryptocurrency, a loyalty points issuer, a gift card issuer, a local payment vendor, or the like. As illustrated in FIG. 9, the system allows a customer to make payments to a merchant regardless of a wired network of the merchant because the system shown provides a replacement for the traditional POS system.

As shown in FIG. 10, the system for customer initiated payment transactions may include a payment transaction process including steps of: a customer launching a digital wallet on a mobile device 200; the digital wallet receiving merchant information and payment information of a merchant 300; the digital wallet receiving a payment method selection for payment; the digital wallet generating a payment authorization request based on the merchant information and the payment method selection; the digital wallet sending the payment authorization request to the CIMT portal 600; the CIMT portal 600 communicating to the merchant 300 a result of a payment transaction; an the digital wallet receiving a result of the payment authorization request from the CIMT 600. As shown in FIG. 10, the CIMT portal may communicate with a payment vendor 400. Examples of a payment vendor 400 include credit card vendors, a bank, cryptocurrency such as Bitcoin, loyalty points issuer, gift card issuer, and the like.

The digital wallet as used herein may be used to describe an electronic wallet such as a cryptocurrency wallet. In the case of cryptocurrency, the digital wallet may facilitate transaction of cryptocurrency between a customer and the merchant via a multi-payment gateway/CIMT portal 600 or the exchange of cryptocurrency to a currency accepted by the merchant 300. In one or more embodiments, the digital wallet may be an application that is installed on a mobile device 200 of the customer.

In addition to a system where the merchant 300 inputs merchant information and payment information into a digital wallet of a customer's mobile device 200 as shown in FIG. 10, a merchant's point-of-sale (POS) device 350 may be used to transfer merchant information and payment information to a customer's mobile device 200. Such a system is shown in FIG. 11 of the drawings. A payment transaction in such a system may include the steps of: the merchant point-of-sale device 350 receiving payment information; the digital wallet of the customer's mobile device 200 sending to the merchant point-of-sale device 350 customer identification; the multi-payment gateway 600 receiving from the merchant point-of-sale device 350 the merchant information and the payment information; the digital wallet receiving the merchant information and the payment information from the multi-payment gateway 600; and the digital wallet receiving a payment method selection for payment from the customer.

Advantageously, the payment transaction system of the present invention may be implemented with a pre-existing POS device 350 of a merchant 300 as shown in FIG. 10; alternatively, a POS device 350 need not be used as shown in FIG. 9.

FIG. 11 illustrates aspects of one or more embodiments of the present invention wherein a merchant 300 receives and sends information to a CIMT portal 600. According to this system, payment information is sent to the CIMT portal 600, which in turn transfers the payment information to the customer mobile device 200. For example, a digital wallet of the mobile device 200 may receive payment information from the CIMT portal, which receives the payment information from a merchant POS device 350. As in the systems described above, the payment vendor 400 of communicates with the CIMT portal 600 to authorize and a payment between the customer and merchant.

Figure 12:
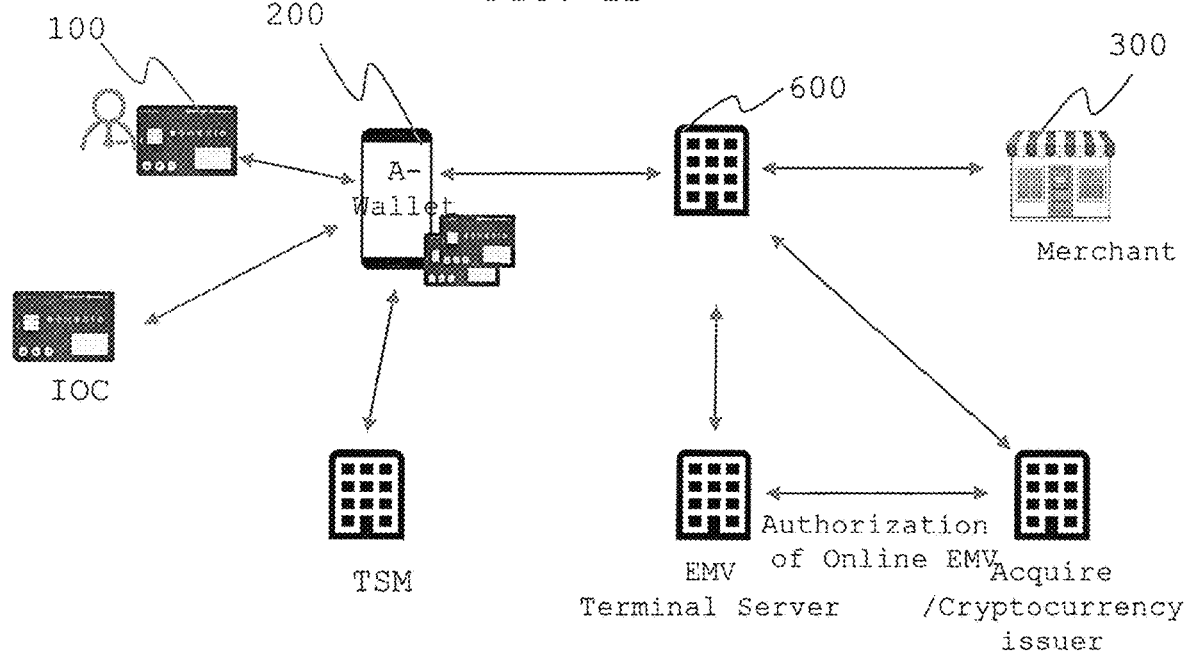
FIG. 12 shows a system for a customer initiated payment transaction according to another embodiment of the present invention.

A digital wallet of the mobile device 200 may facilitate payment by a plurality of payment means. In FIG. 12, a digital wallet is designated as an "A-Wallet." The A-Wallet may be registered by multiple payment methods. The multiple payment methods may include a credit card having an NFC chip for NFC payments. Another payment method may be an IOC, which enables payment via a Bluetooth network. An MFD card 100 having multiple payment cards as described above may also be registered to be used by the A-Wallet. Additionally, an over-the-air (OTA) card issued by a trusted server manager (TSM) may be registered on the A-Wallet. Other virtual cards, such as those associated with a loyalty point program or a mileage program may be registered to the A-Wallet. As shown in FIG. 12, the mobile device 200 having the A-Wallet communicates with the multi-payment gateway (MPG) 600 during a payment transaction. Advantageously, the system of the present invention allows for payment transaction using various technologies.

Additionally, a variety of payment currencies may be used in the system. Such currencies include but are not limited to conventional currencies, cryptocurrency, and loyalty points. For credit card payments, the MPG 600 may authorize payment to a merchant 300 by communication with a EMV Terminal Server. For cryptocurrency and loyalty points payments, the MPG 600 may communicate with an appropriate acquirer, such as a cryptocurrency issuer. Additionally, such an acquirer may communicate with the EMV terminal server.

Figure 13:
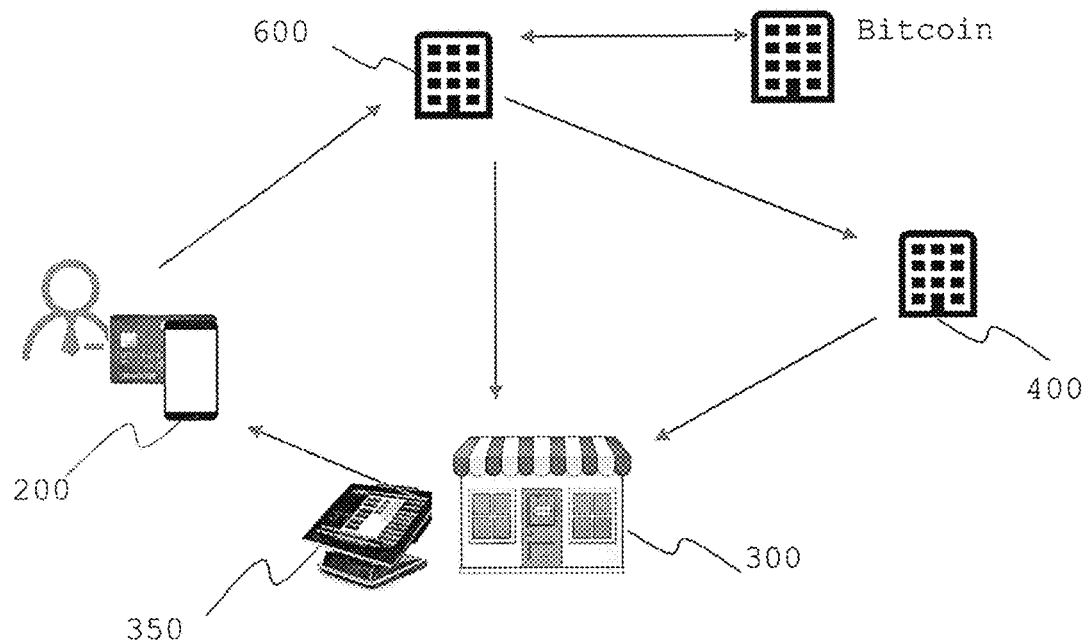
FIG. 13 shows a system for a payment transaction using cryptocurrency according to another embodiment of the present invention.

Cryptocurrency may include Bitcoin or another cryptocurrency. FIG. 13 shows a system for a payment transaction using Bitcoin according to the present invention. It is to be understood that another form of cryptocurrency may be alternatively or additionally used in the present invention.

As illustrated in FIG. 13, after receiving payment information and merchant information from the merchant POS device 350, the digital wallet of the mobile device 200 of the customer may send a cryptocurrency payment request to the MPG 600 using a public cryptographic address of the MPG 600. The value of the cryptocurrency may be calculated by an exchange rate at the time of the payment and cryptocurrency used for payment may be exchanged to a currency accepted by the merchant. If the MPG 600 has a pre-existing contract for payment with the merchant, the MPG 600 may facilitate the payment directly with the merchant 300. If the merchant 300 does not have such a contract, the MPG 600 may request payment to a credit card company 400 or a bank having a payment method accepted by the merchant 300, which in turn may communicate the payment transaction with the merchant 300. Accordingly, cryptocurrency may be used by the customer for a payment, but the merchant 300 may receive a currency that is not cryptocurrency.

Figure 14:
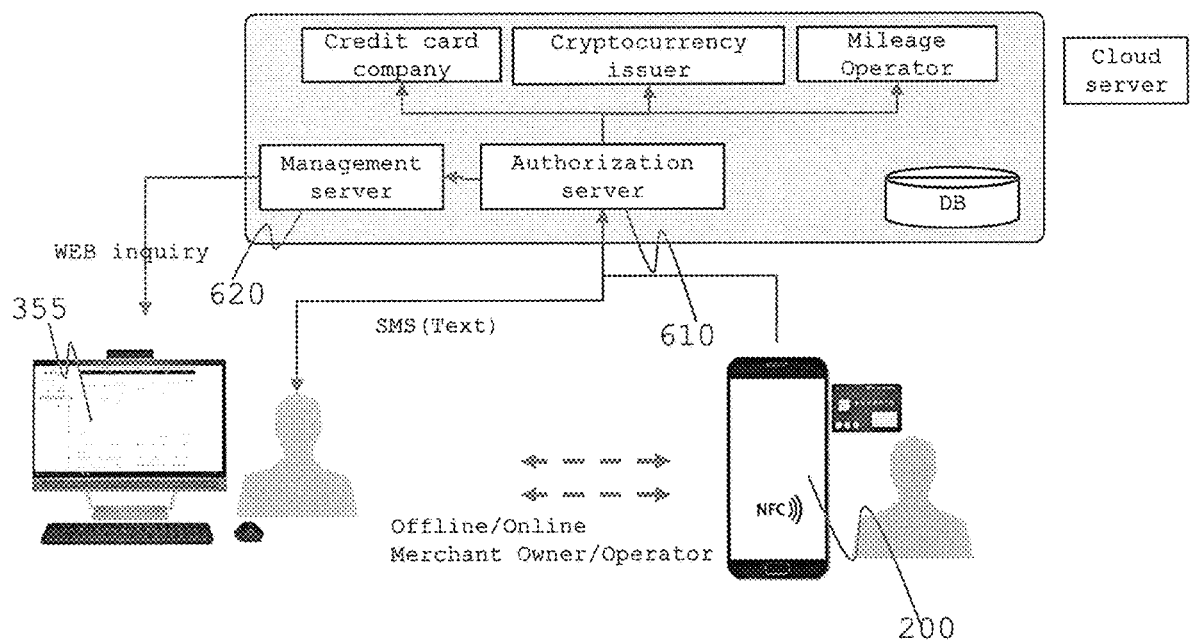
FIG. 14 shows a system for a payment transaction implementing multiple payment methods according to the present invention.

FIG. 14 shows another diagram implementing multiple payment methods using a multiple-payment gateway 600, which in FIG. 14 is embodied by the authorization server 610 and the management server 620. The diagram shows different payment methods enabled by entities such as a credit card company, a cryptocurrency issuer, or a mileage operator (issuing loyalty points in the form of mileage points) in communication with an authorization server, which communicates with a management server 620 and a merchant 300. The merchant 300 may inquire and view the result of payment transactions using a merchant management system 355, which may provide payment transaction information based on a database of the payment transaction system. The authorization server 610 may also be in communication with a mobile device 200 of the customer, which provides to the authorization server 610 a payment method selection and customer information. The authorization server may communicate to the merchant 300 payment transaction information by a messaging service such as SMS text messages. Other messaging services such as internet-protocol based messaging services may be used to communicate with the merchant 300.

Figure 15:
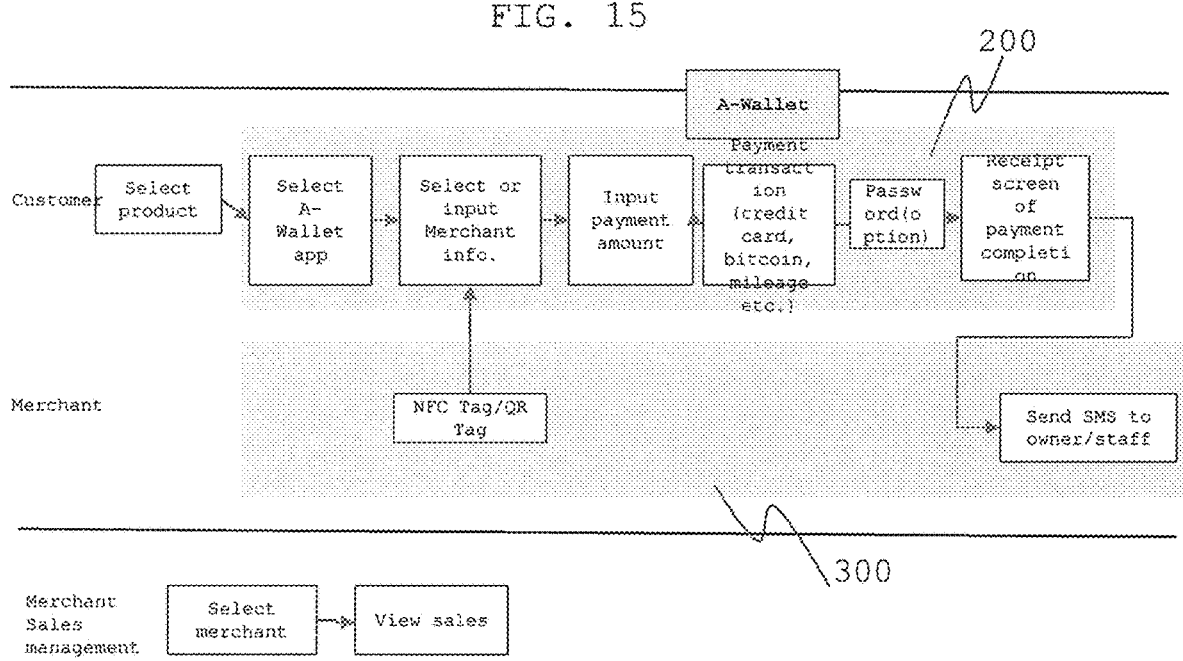
FIG. 15 shows a process for a payment transaction for a purchase from an offline merchant according to the present invention.

FIGS. 15-20 show various processes for payment transactions according to embodiments of the present invention. FIG. 15 shows a process for a payment transaction for a purchase from an offline merchant 300. In this example, a digital wallet, in the form of a mobile payment application on an iOS or Android operating system is installed on a mobile device 200 of the customer. Additionally, a form of payment, such as a credit card, is registered on the digital wallet. The merchant 300 may include merchant information. Such merchant information may be communicated to the digital wallet via NFC tag of the merchant 300 or a QR tag of the merchant 300.

In the process illustrated in FIG. 15, the customer may select a product for purchase. Upon launching the digital wallet, A-Wallet, on a mobile device 200, the customer may receive merchant information by scanning the merchant QR code or by NFC. The customer may then input a payment amount and a payment method. Optionally, the digital wallet may require a password for an added layer of security. Finally, the digital wallet may display a receipt screen of payment completion and send a message to the merchant. For example, the digital wallet may send an SMS message to a mobile device of the merchant 300. As another part of the payment transaction system, the merchant may view sales on the merchant sales management viewer as described earlier.

Figure 16:
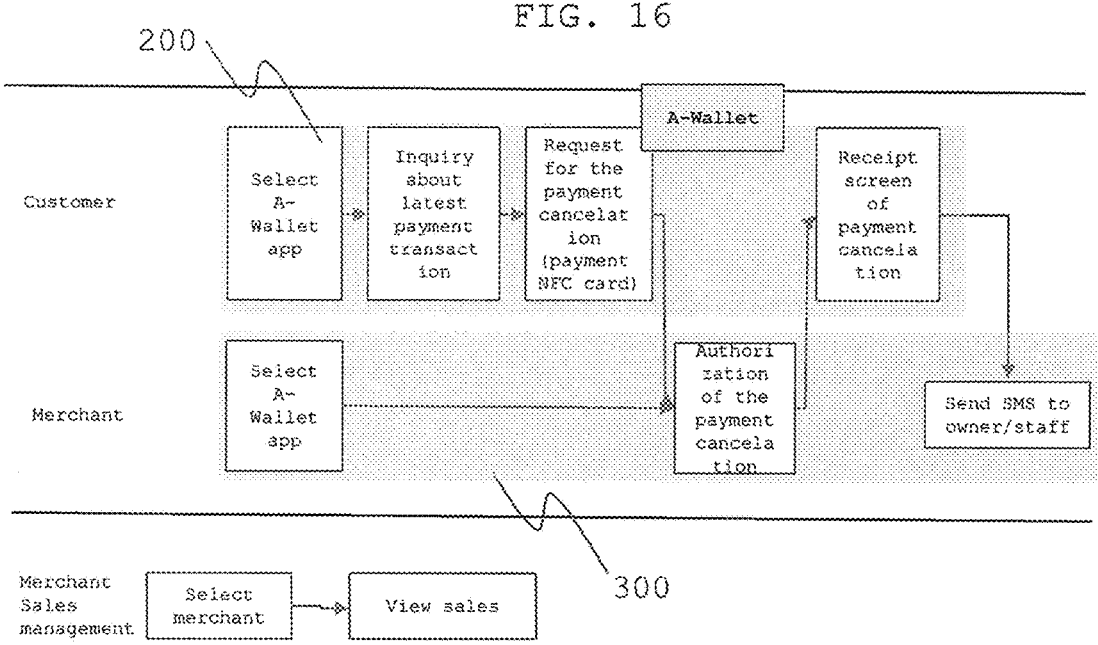
FIG. 16 shows a process for a cancelation of a purchase from an offline merchant according to the present invention.

Such a payment transaction may be canceled upon request of the customer, as illustrated in FIG. 16. According to such embodiments of the present invention, the customer may select the digital wallet, A-wallet, and inquire about his latest payment transaction. For a payment cancelation, the digital wallet may send a payment cancelation request to the merchant 300. For example, in case the customer wishes to receive a refund for a purchase, the customer may use card information from an NFC card to request cancelation through NFC to the merchant POS device or a merchant digital wallet of a merchant mobile device. In turn, the merchant may authorize the payment cancelation, and the digital wallet of the customer may display a receipt screen of the payment cancelation completion. As described above, the customer digital wallet may send a confirmation message to the merchant 300 and the merchant 300 may view results of the cancelation on a merchant sales management viewer.

Figure 17:
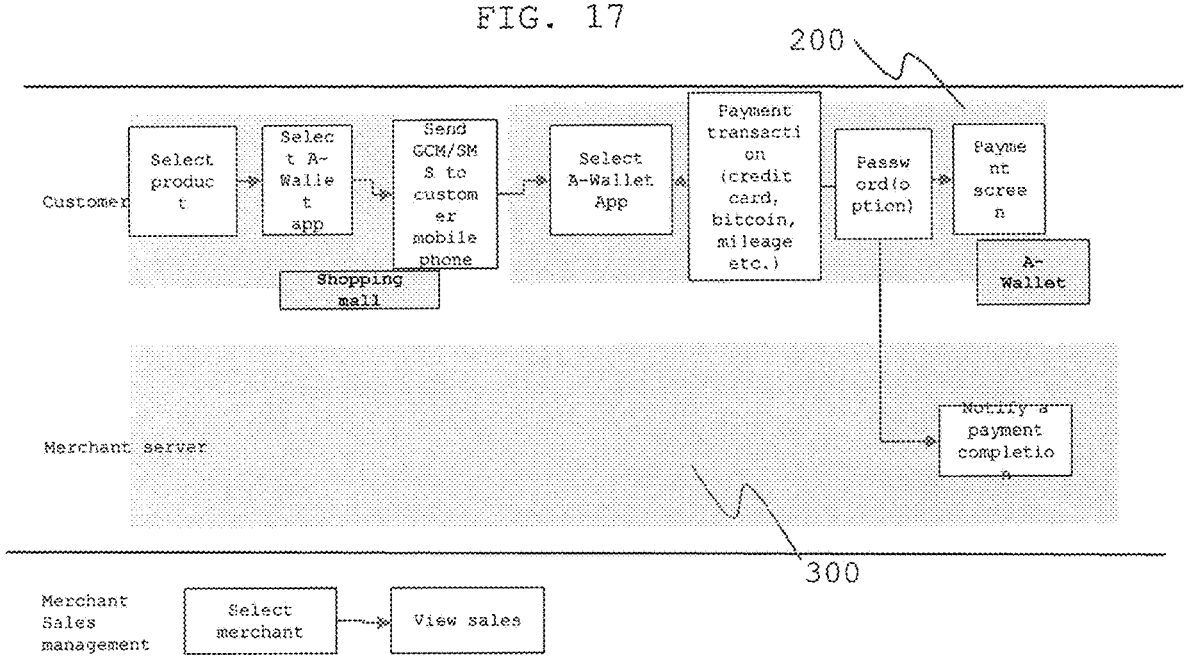
FIG. 17 shows a process for a payment transaction from a customer's personal computer according to the present invention.

FIG. 17 shows a process for a payment transaction for a purchase from an online merchant when the customer makes the purchase using a personal computer (PC). In this example, a digital wallet, in the form of a mobile payment application on an iOS or Android operating system is installed on a mobile device 200 of the customer. Additionally, a form of payment, such as a credit card, is registered on the digital wallet.

In the process illustrated in FIG. 17, the customer may select a product for purchase in an online shopping mall and select payment by a digital wallet, A-Wallet. The customer may receive a message by a messaging service such as GCM or SMS on the customer's mobile device form the online shopping mall. The customer may select the digital wallet and input a payment amount and a payment method in the digital wallet. Optionally, the digital wallet may require a password for an added layer of security. Finally, the digital wallet may display a receipt screen of payment completion and send a message to the merchant. For example, the digital wallet may send an SMS message to a mobile device of the merchant 300. As another part of the payment transaction system, the merchant may view sales on the merchant sales management viewer as described earlier.

Figure 18:
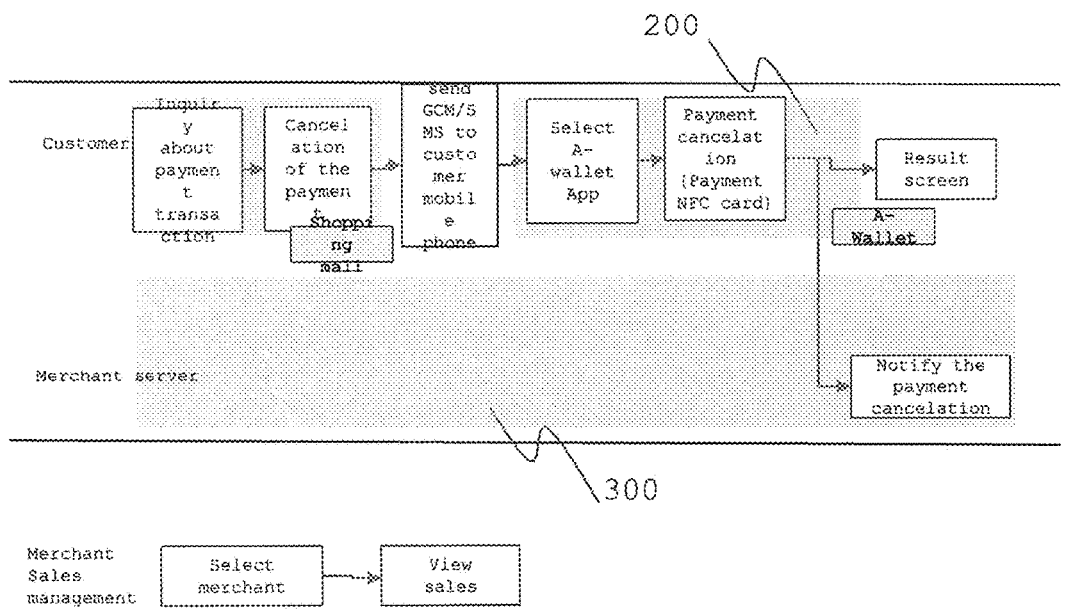
FIG. 18 shows a process for a cancelation of a payment transaction from a customer's personal computer according to the present invention.

FIG. 18 illustrates a process of a cancelation of an online purchase. The customer may inquire about a payment transaction in an online shopping mall and request cancelation of a payment. The customer may receive a message by GCM or SMS for confirmation of a payment cancelation. The customer may then launch the digital wallet, A-Wallet, and select a payment cancelation, for example, of a payment by a NFC credit card. The digital wallet may then display a result screen to confirm the cancelation and notify the merchant 300 of the payment cancelation. Such a cancelation may be reflected in the merchant sales management viewer.

Figure 19:
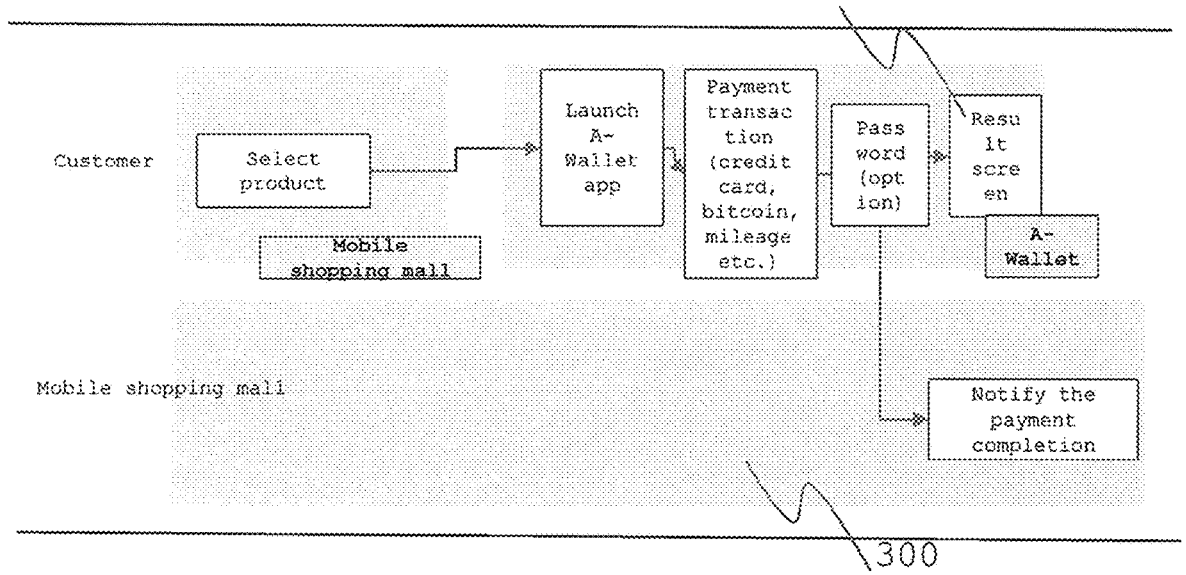
FIG. 19 shows a process for a purchase on a mobile shopping platform according to the present invention.

FIG. 19 shows a process for a purchase on a mobile shopping platform according to the present invention. In a mobile shopping mall, the customer may select a product for purchase. The customer may then launch a digital wallet, A-Wallet, on the mobile device and select a payment transaction method, such as a credit card, Bitcoin, or mileage points. Other payment methods may be used. The digital wallet may optionally request a password for authorizing the payment transaction. Finally, the digital wallet may display a result screen and notify the merchant 300 of the payment completion.

It is to be understood that a password as used throughout this disclosure may include an alphanumeric password of a predetermined length, but may be an additional or alternative form of security, such as a fingerprint scan or facial recognition feature.

Figure 20:
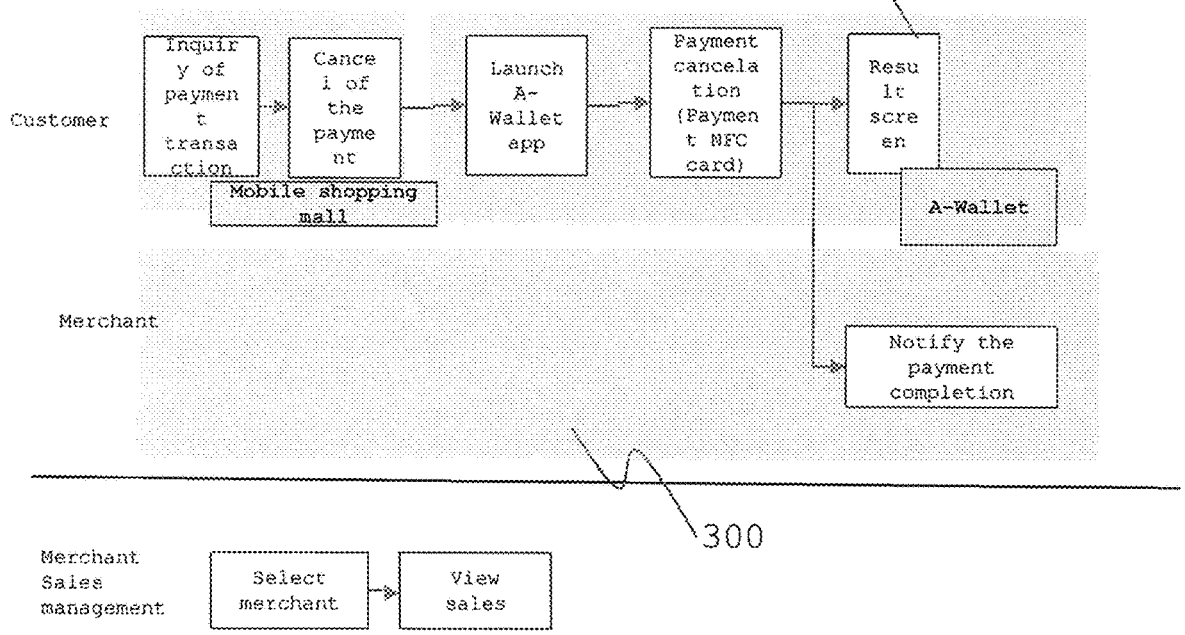
FIG. 20 shows a process for a cancelation of a payment transaction from a mobile shopping platform according to the present invention.

FIG. 20 shows a process for a cancelation of a payment transaction from a mobile shopping platform according to the present invention. Such a process may include the customer inquiring of the payment transaction in a mobile shopping mall and canceling the payment. In turn, a digital wallet may be launched to proceed with the payment cancelation. Finally, the digital wallet may display a result screen and notify the merchant 300 of the cancelation.

FIG. 21 shows exemplary screens on a digital wallet of a customer's mobile device 200 during a process for an offline payment authorization using the mobile phone 200 according to the present invention. First, a global positioning system (GPS) sensor of the mobile phone may be activated to detect the customer's location. The digital wallet may display a list of merchants 300 that are in close vicinity of the customer. As a way of example, in FIG. 21, the digital wallet suggests "CU Yeouido Branch" and "Good Pharmacy" as possible merchants based on the customer's location. Additionally, the customer may manually input a merchant ID if the merchant 300 is not one suggested by the digital wallet. Merchant information may also be scanned in using a merchant information QR code. Additionally, or alternatively, merchant information may be received by the digital wallet of the customer's mobile device 200 by another communication network such as NFC or Wi-Fi.

Next, the customer may input a payment amount into the digital wallet. The customer may also select a payment method. In FIG. 21, a contactless credit card is selected the digital wallet prompts the customer to scan the payment card. As described above, one or more of other payment methods may be used according to various embodiments of the present invention.

Next, the digital wallet may prompt the customer to input a password for the selected payment option. In the example shown in FIG. 22, the digital wallet prompts the user to enter the first two digits of the password. As described above, various other kinds of passwords may be used to authorize payment. Alternatively, "one-click" payment methods may be used, wherein payments are made without entering additional passwords. Upon completion of payment, the digital wallet may display a payment receipt, which may be saved to the mobile device.

Figure 22:
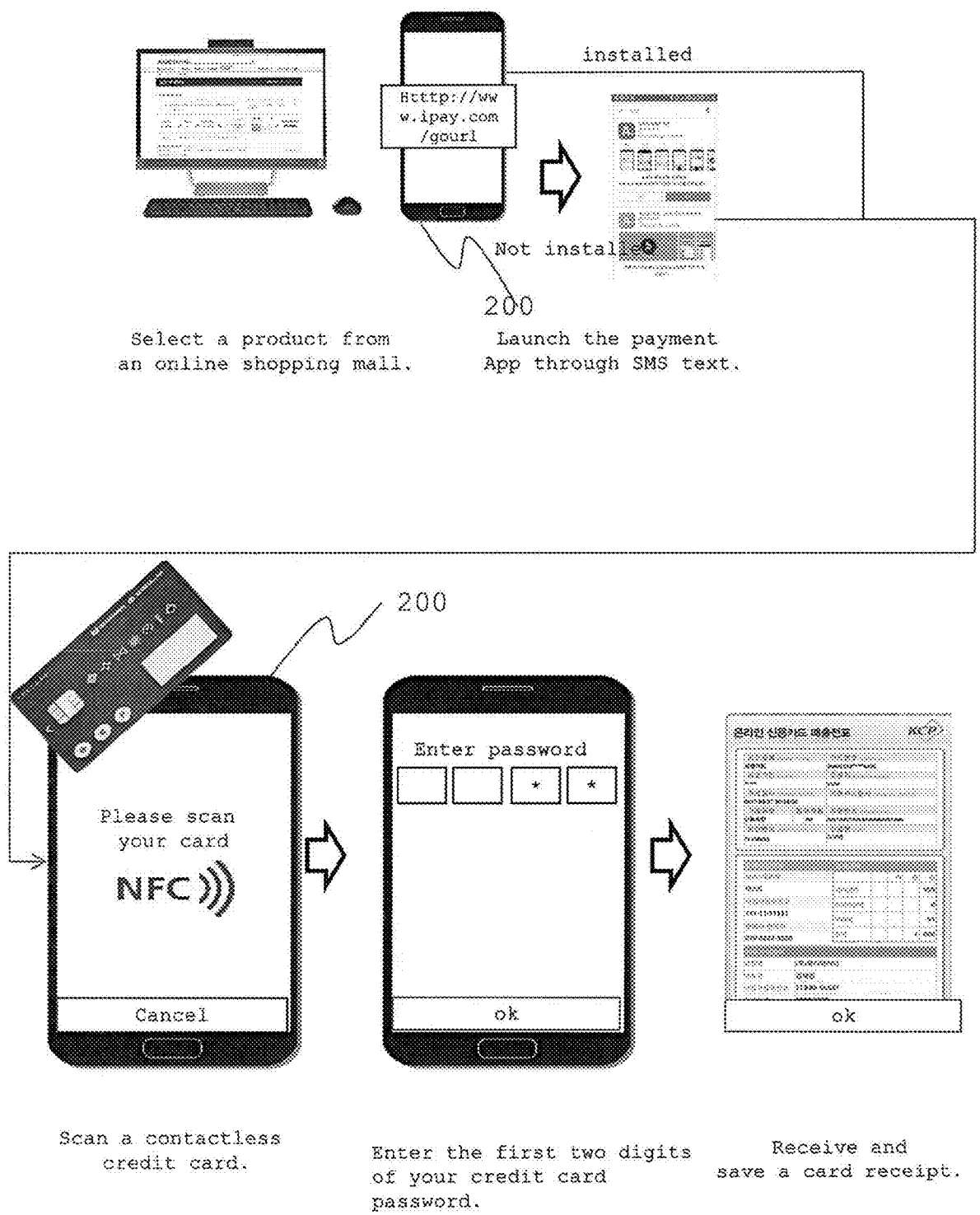
FIG. 22 shows a process for a payment authorization via a personal computer according to the present invention.

FIG. 22 shows a process for a payment authorization via a personal computer according to the present invention. First, a customer may select a product from an online shopping mall and launch the digital wallet upon receipt of a message from a messaging service. For example, the online shopping mall may send a SMS text to the customer to complete a payment transaction. If a digital wallet application is not installed on the mobile device 200, the mobile device 200 may direct the customer to an application marketplace to provide the customer an option to download and install the digital wallet.

Next, the customer may select a method of payment such as a NFC card. The digital wallet may optionally require the customer to input a password. As described above, the digital wallet may display a payment receipt upon completion of the payment transaction.

Figure 23:
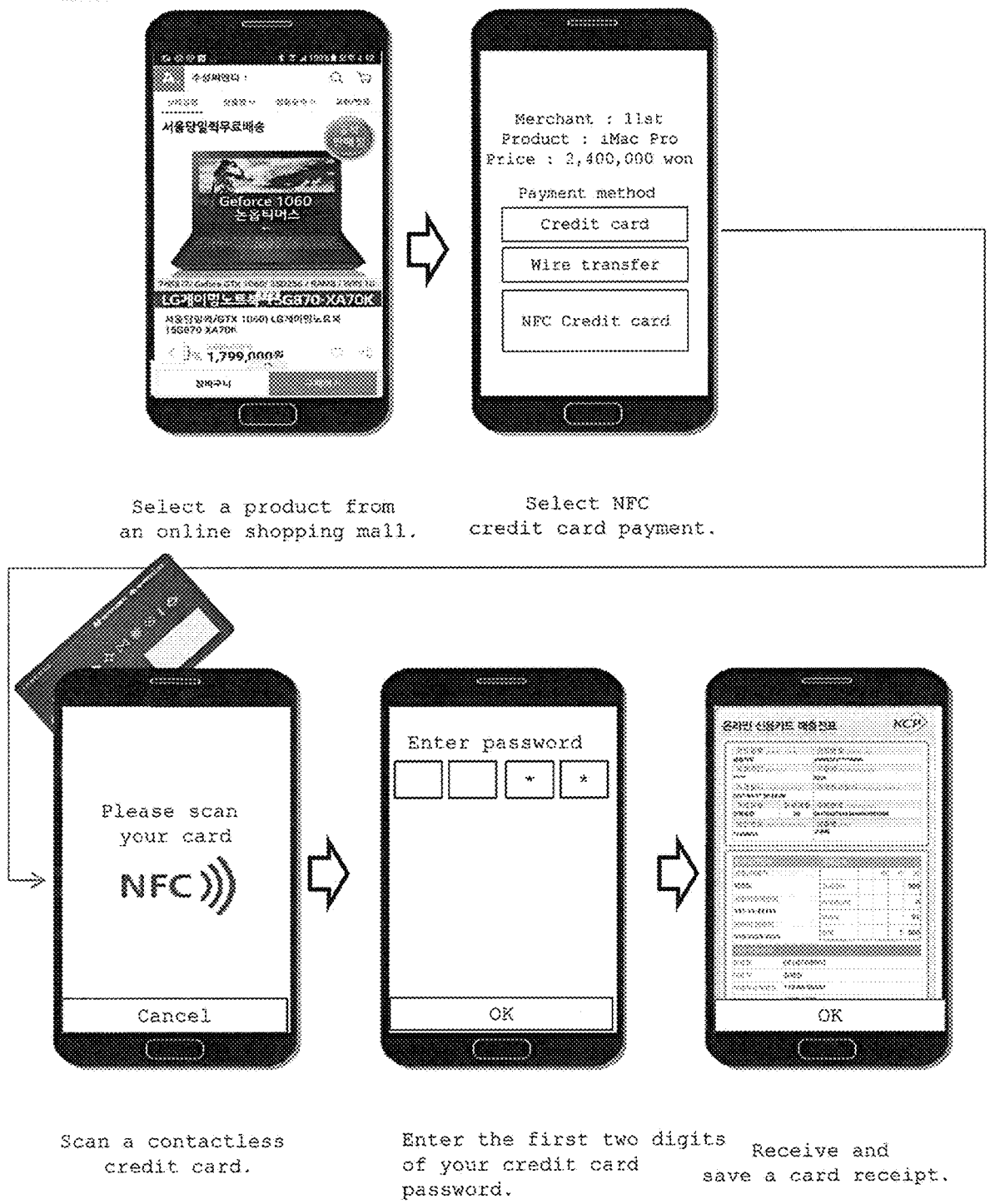
FIG. 23 shows a process for a payment authorization via a mobile device according to the present invention.

Similarly, FIG. 23 shows a process for a payment authorization via a mobile device according to the present invention. The customer may select a product from an online shopping mall available on the mobile device 200. The digital wallet may then prompt the customer to select a payment option. In the example shown in FIG. 23, the mobile device 200 displays "credit card," "wire transfer," and "NFC credit card" as possible payment options, but other payment options such as cryptocurrency may be used. If a NFC card is selected, the selected card may be scanned as shown in FIG. 23. As described above, the digital wallet may prompt the customer to input a password or a partial password. Upon completion of the payment transaction, the customer may view and save a payment receipt on the mobile device 200.

Figure 24:
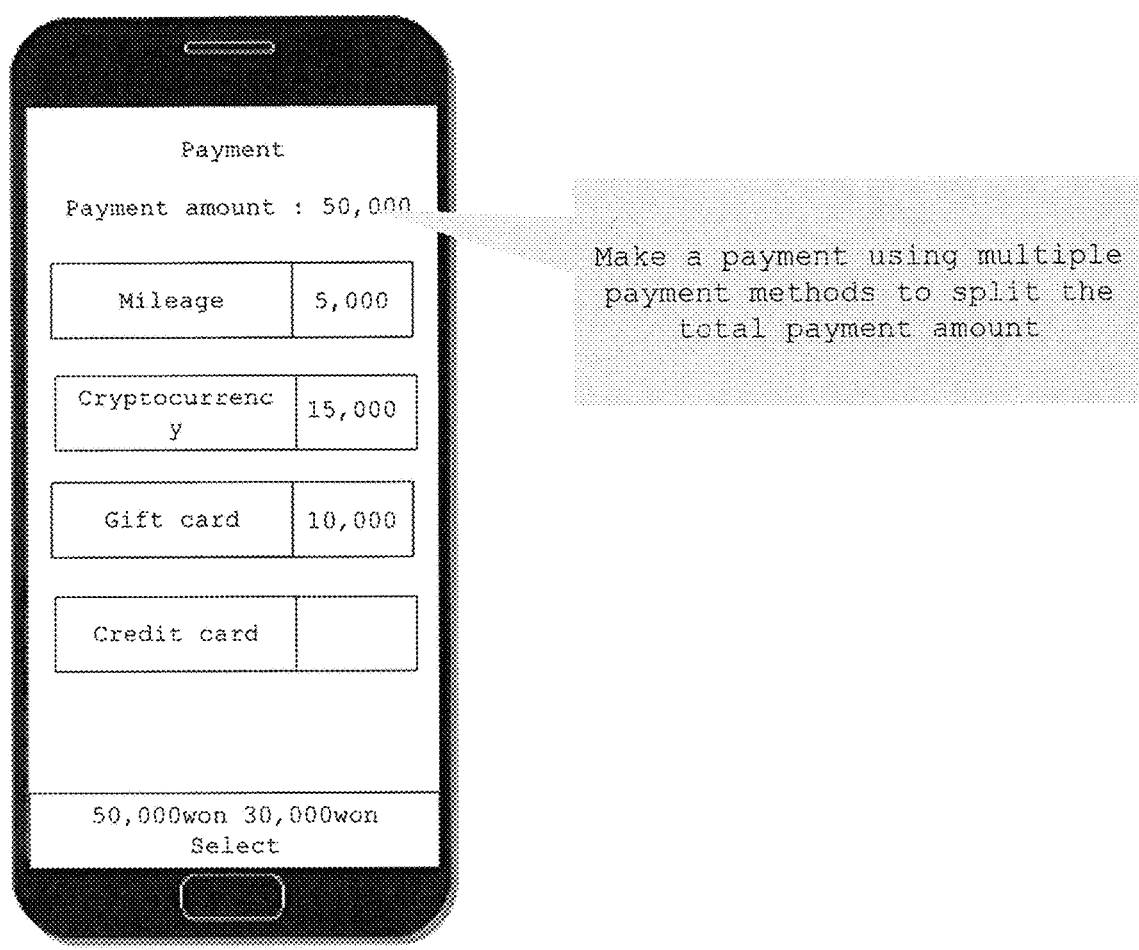
FIG. 24 shows a payment method selection screen according to the present invention.

An advantageous feature of the system having the multi-payment gateway 600 is that the customer may select a plurality of different payment options to make a payment. For example, FIG. 24 shows a payment method selection screen according to the present invention, wherein a purchase may be split into payments from mileage points, cryptocurrency, a gift card, and a credit card. Such purchases may be paid from different percentages of various payment accounts. Such a payment option is facilitated by the multi-payment gateway 600.

Figure 25:
FIG. 25 is an image showing an exemplary screen for viewing an account transaction history according to the present invention.
Figure 26:
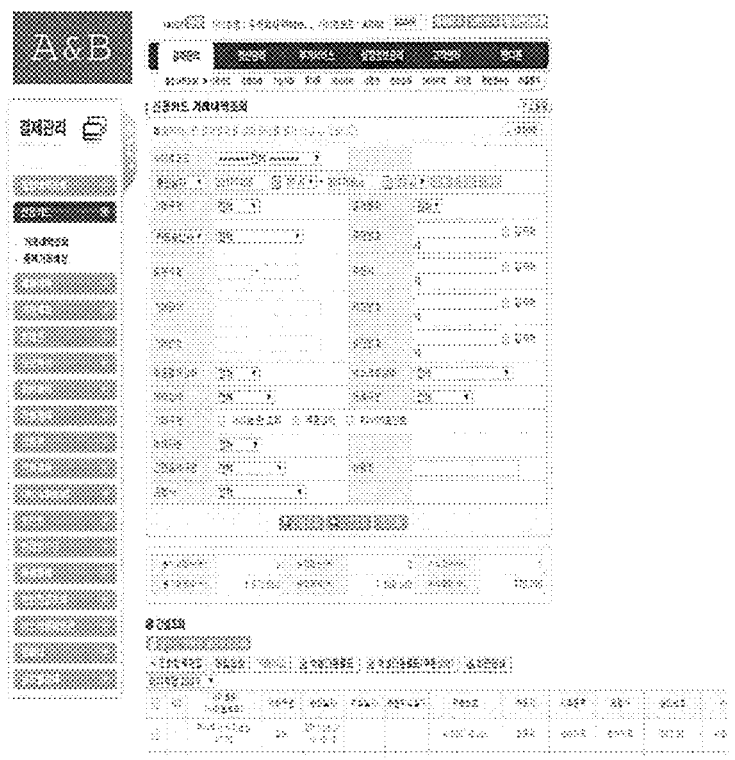
FIG. 26 is an image showing an exemplary screen for viewing account balances for multiple payment options according to the present invention.

FIGS. 25 and 26 show exemplary screens for the merchant management viewers of the merchant 300 as described above. FIG. 25 illustrates a screen showing total sales history by date. FIG. 26 illustrates a screen showing sale history for various factors including certain credit card transactions, customer initiated payments, payments by reward points of a loyalty points program, cryptocurrency, and the like.

Figure 27:
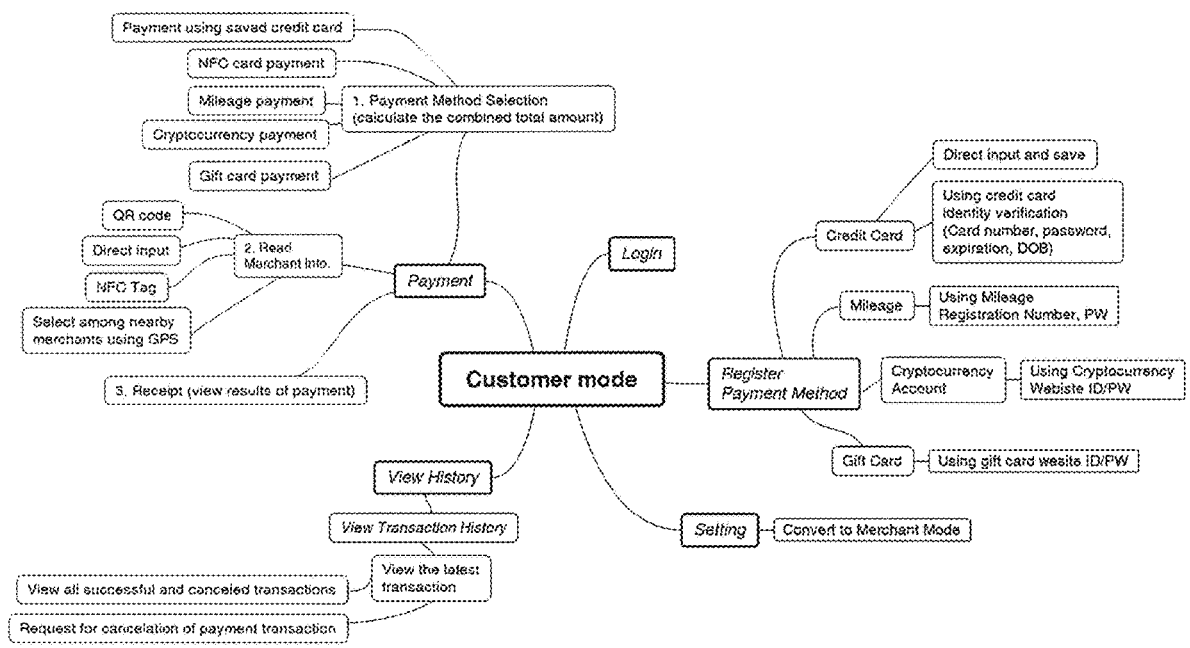
FIG. 27 is a diagram showing processes for using a payment transaction application in a customer mode according to the present invention.

FIG. 27 is a diagram showing an overview of processes for using a payment transaction application, such as a digital wallet, in a customer mode according to the present invention. As a customer, the digital wallet provides the options of: login, register payment method, settings, payment, and view history.

Types of payment methods that may be registered include credit cards, mileage points, cryptocurrency, and gift cards. For registering a credit card, the digital wallet may require input of credit card information and identify verification (e.g., card number, password, expiration, date of birth, etc.). Registering mileage may include inputting a mileage registration number and a password. Registering cryptocurrency may include inputting a login ID and password for a cryptocurency exchange website. For registering a gift card, the customer may input an identification and a password.

Payment by the digital wallet includes payment method/methods selection, receiving merchant information, and receiving payment confirmation. Payment method selection includes, but is not limited to, credit card, NFC card, mileage, cryptocurrency, and a gift card. Merchant information may be received by direct input, a QR code, a NFC tag, or be selected among nearby merchants using GPS.

Figure 28:
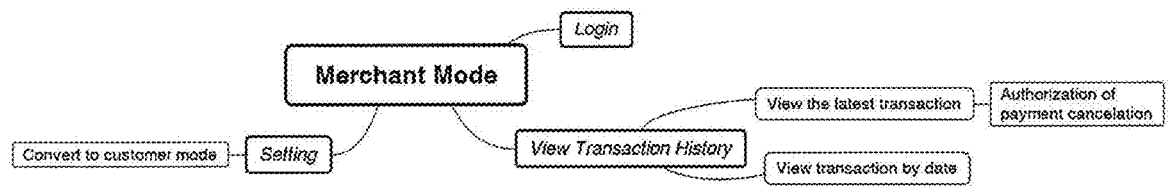
FIG. 28 is a diagram showing processes for using a payment transaction application in a merchant mode according to the present invention.

The customer may also view transaction history in the digital wallet, including a list of requested, completed, and canceled transactions. A payment cancelation may be requested by the customer Under the digital wallet's settings, the digital wallet may be switched to a merchant mode. FIG. 28 is a diagram showing processes for using a digital wallet, a payment transaction application, in a merchant mode according to the present invention. Merchant options include authorization of payment cancelation.

Figure 29:
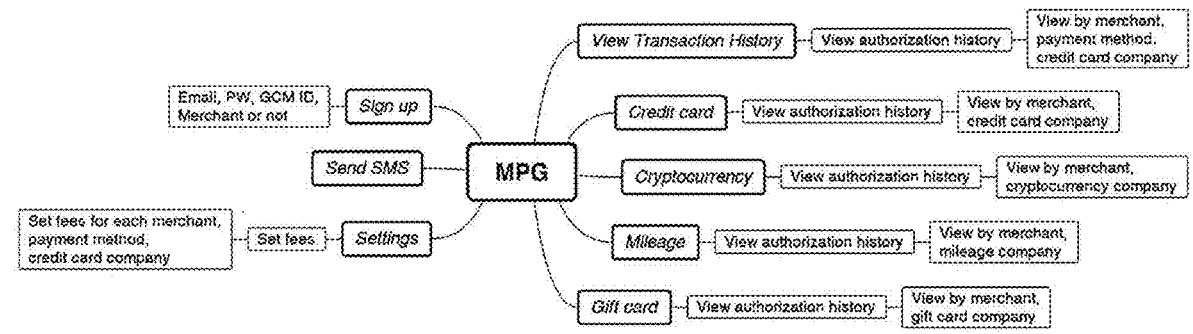
FIG. 29 is a diagram showing processes for using a payment transaction application in a multi-payment gateway mode.

FIG. 29 is a diagram showing processes for using a payment transaction application in a multi-payment gateway (MPG) mode. As shown in FIG. 29 and described above, the multi-payment gateway plays a central role in the various embodiments of the present invention. The multi-payment gateway may sign up merchants and set fees for merchants, payment methods, and various credit card companies. Additionally, the multi-payment gateway may view transaction history and provide the information for the transaction history viewed by the merchant and various payment entities, such as credit card companies, cryptocurrency issuers, mileage points companies, and gift card companies.

Figure 30A:
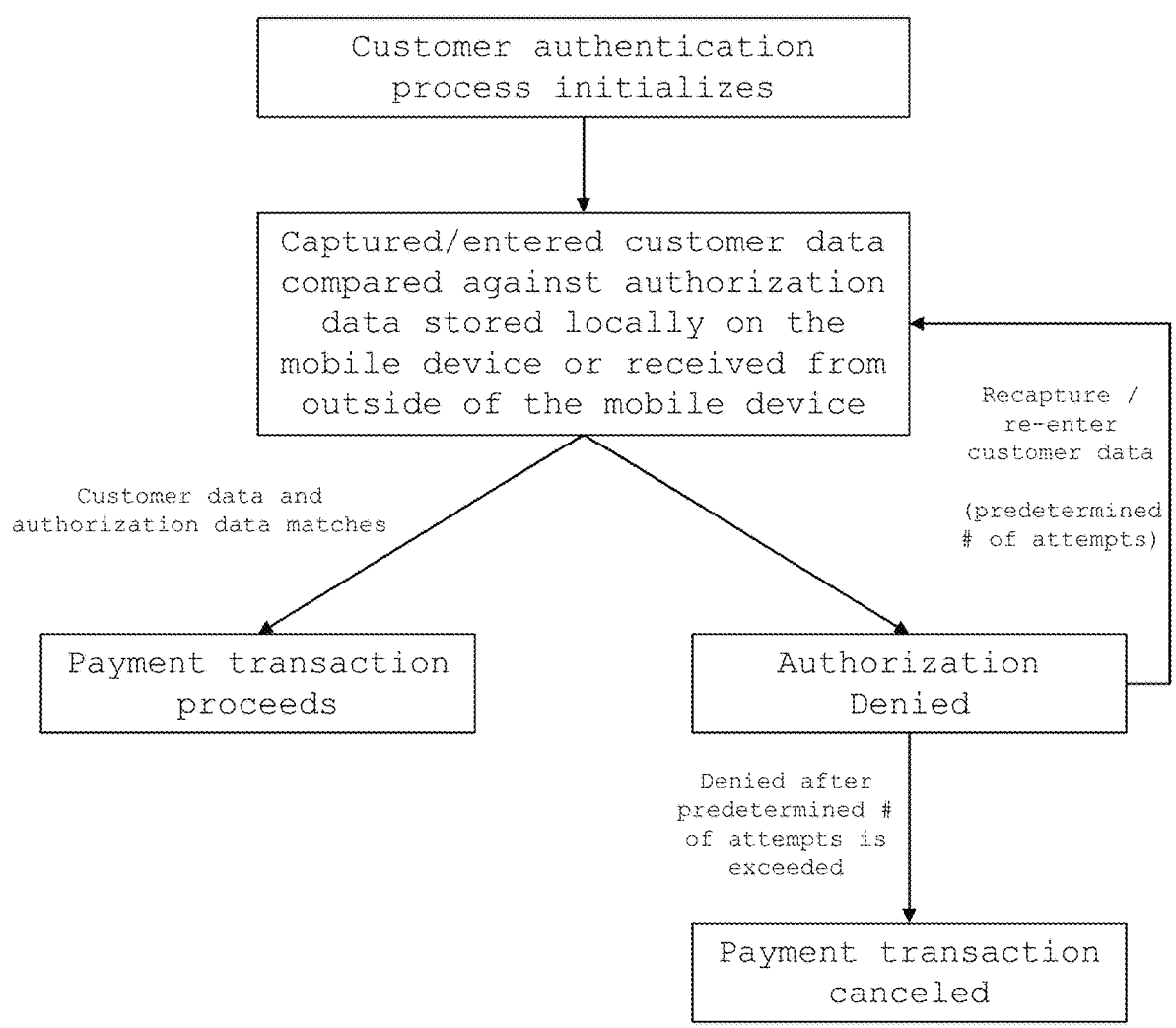
FIGS. 30A-B show processes for customer authentication according to the present invention
Figure 30B:
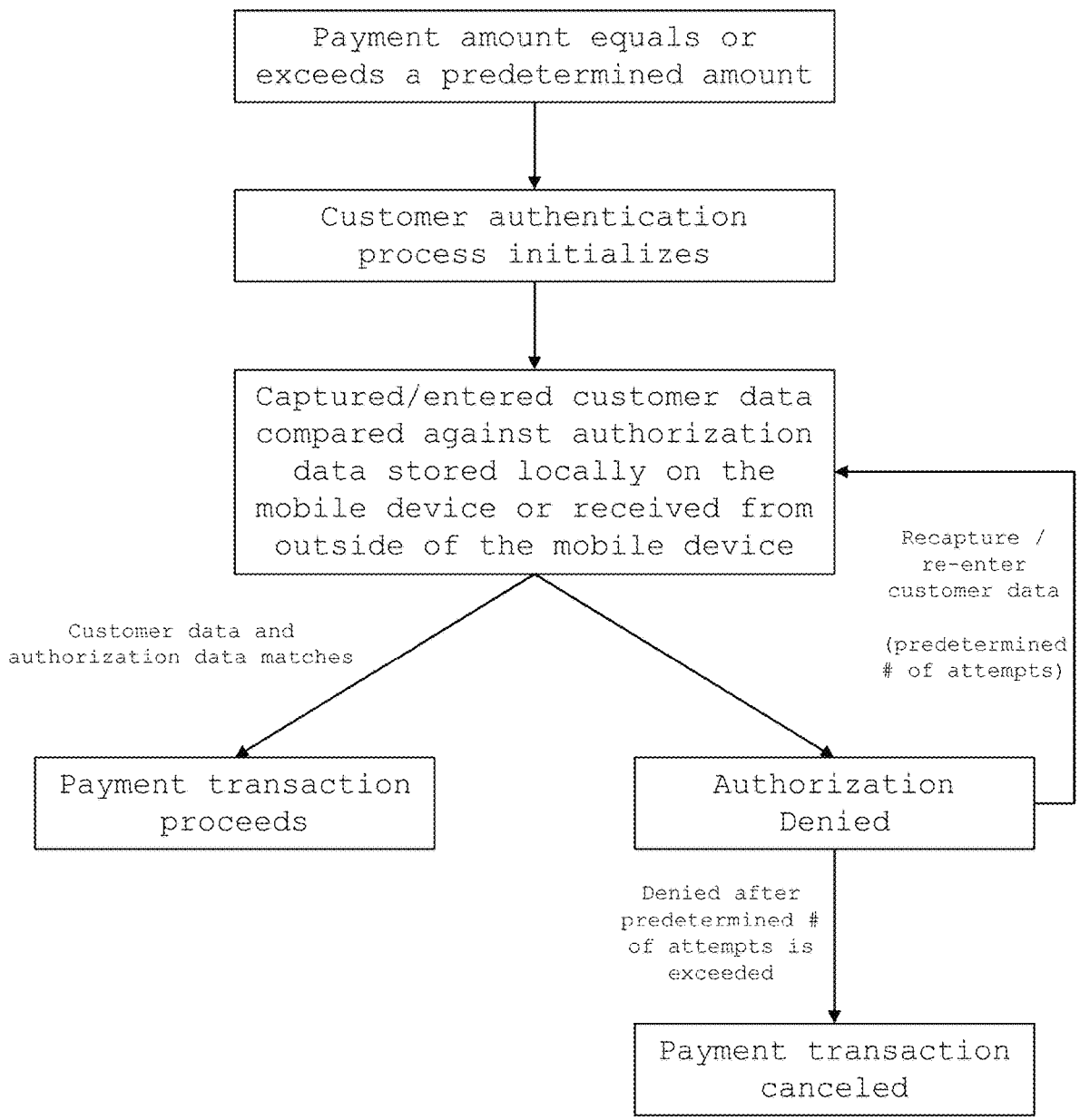

All embodiments of the present invention may include a process of authenticating the customer as shown in FIG. 30A, which can be initialized at any step of the payment transaction prior to receiving a result of the payment authorization request from the acquirer 40 and/or the issuer 50. If required by local rules and regulations, the process of authenticating the customer may be initialized if a payment amount equals or exceeds a predetermined amount as shown in FIG. 30B. The predetermined amount may be any amount in the currency of the jurisdiction that the mobile device 200 is found in at a given time, the location of the mobile device 200 being determined by global position system information provided by the mobile device 200. The predetermined amount will be in accordance to the rules and regulations of the jurisdiction and whether this authentication process that relates to the payment amount equaling or exceeding this predetermined amount as required by the jurisdiction. In such a jurisdiction requiring this customer authentication, the mobile application or the digital wallet 100 initiates a process of authenticating the customer if the payment amount equals or exceeds a predetermined amount. Additionally, the process of authenticating the customer may further include the step that the customer is authenticated when the mobile application becomes activated and establishes the mobile device 200 as the POS device such that the payment transaction process need not to be interrupted when the payment amount is known in the system. Whether the process of authenticating the customer is initiated when the payment amount is known or not, this process does not initiate when the mobile application or the digital wallet 100 of the present invention has not been activated.

The process of authenticating the customer further includes password verification and/or biometric verification. The password verification may include customer entry of their password or personal identification number (PIN) into a field presented by the mobile application or the digital wallet 100; in other words, information preferably known only to the customer. Biometric verification may leverage biometric recording/storage capabilities of the mobile device (typically via documented application programming interfaces (API's)) to record and store biometric data which includes (but is not limited to) iris and/or retina scan(s), voice print(s)/template(s), fingerprint scan(s), facial scan(s), physical patterns, and like data that is personal only to the customer. Likewise, the mobile application or the digital wallet 100 of the present invention may leverage API's from other applications and operating systems installed on the mobile device to present interactive fields for password verification.

Furthermore, the mobile application or the digital wallet 100 may be configured to receive the payment information or the merchant information from manual input, by the customer or the merchant, into the mobile application. Additionally, or alternatively, the mobile application or the digital wallet 100 may be configured to receive the payment information or the merchant information via a text message. Additionally, or alternatively, the mobile application or the digital wallet 100 may be configured to receive the payment information or the merchant information from a system of the merchant.

The process of authenticating the customer further includes the system receiving from the merchant an identifier for the customer and a phone number of the customer stored in a third-party server. Alternatively, the identifier for the customer and the phone number from the customer may be stored in the server associated with the mobile application/the digital wallet, in the multi-payment gateway, and/or in the mobile device 200 of the customer (e.g. from registration). The system compares the phone number of the mobile device 200 to the phone number of the customer received from the merchant, the server, the third-party server, or the multi-payment gateway. The system then allows the payment transaction to proceed if the phone number of the mobile device 200 matches the phone number of the customer received from the merchant, the server, the third-party server, or the multi-payment gateway. The data compared here can be referred to as possession-based data, which includes (but is not limited to) phone number, the card information, or any other data that proves the customer owns the device and/or payment card 10 as registered.

For the process of authenticating the customer at least two out of the three data types (knowledge-based, personal-based, and possession-based) may be required to be verified for the payment transaction to proceed. Knowledge-based data types include types of data that only the customer knows, e.g. PIN or a password. Personal-based data types include types of data that is part of the customer, which includes biometric data and the like. Possession-based data types include types of data indicating the customer's possession of something, like a mobile device and/or a payment card.

To further secure mobile application or the digital wallet, the system of the customer-initiated payment transaction may further include a unique identifier stored in the server, merchant server, a third party server, or a third-party institution; and a local identifier stored in the mobile device 200. The unique identifier is at least one of any of the following: phone number of the mobile device 200, a name of the customer, and an email address of the customer. Therefore, the unique identifier may be the phone number of the mobile device 200; the phone number of the mobile device 200 and a name of the customer; the mobile device 200, the name of the customer, and the email address of the customer; the name of the customer; the name of the customer and the email address of the customer; the phone number of the mobile device 200 and the email address of the customer; or the email address of the customer. The local identifier is at least one of any of the following: phone number of the mobile device 200, a name of the customer, and an email address of the customer. Therefore, the local identifier may be the phone number of the mobile device 200; the phone number of the mobile device 200 and a name of the customer; the mobile device 200, the name of the customer, and the email address of the customer; the name of the customer; the name of the customer and the email address of the customer; the phone number of the mobile device 200 and the email address of the customer; or the email address of the customer. The step of activating the mobile application or the digital wallet further includes the system reading the unique identifier and the local identifier such that the mobile application becomes activated and establishes the mobile device 200 as the POS device upon: the chip serial number or the card serial number from the payment card matching the chip serial number or the card serial number stored in the mobile device (e.g. the chip serial number matching the chip serial number stored in the mobile device 200, or the card serial number from the payment card 10 matching the card serial number stored in the mobile device 200); and the local identifier matching the unique identifier.

The step of activating the mobile application or the digital wallet may further include verifying the payment card 10 via a transaction of a nominal cash amount to the acquirer 40. Typically the merchant will request an authorization for the transaction to confirm whether the customer's account is open, active, and contains enough funds to cover the payment amount when the request was made. An additional nominal amount, such as $1 on top of the payment amount, may be included in the request. This nominal both is typically credited back to the customer's account after a few business days following the request typically after the payment transaction has concluded.

Figure 30C:
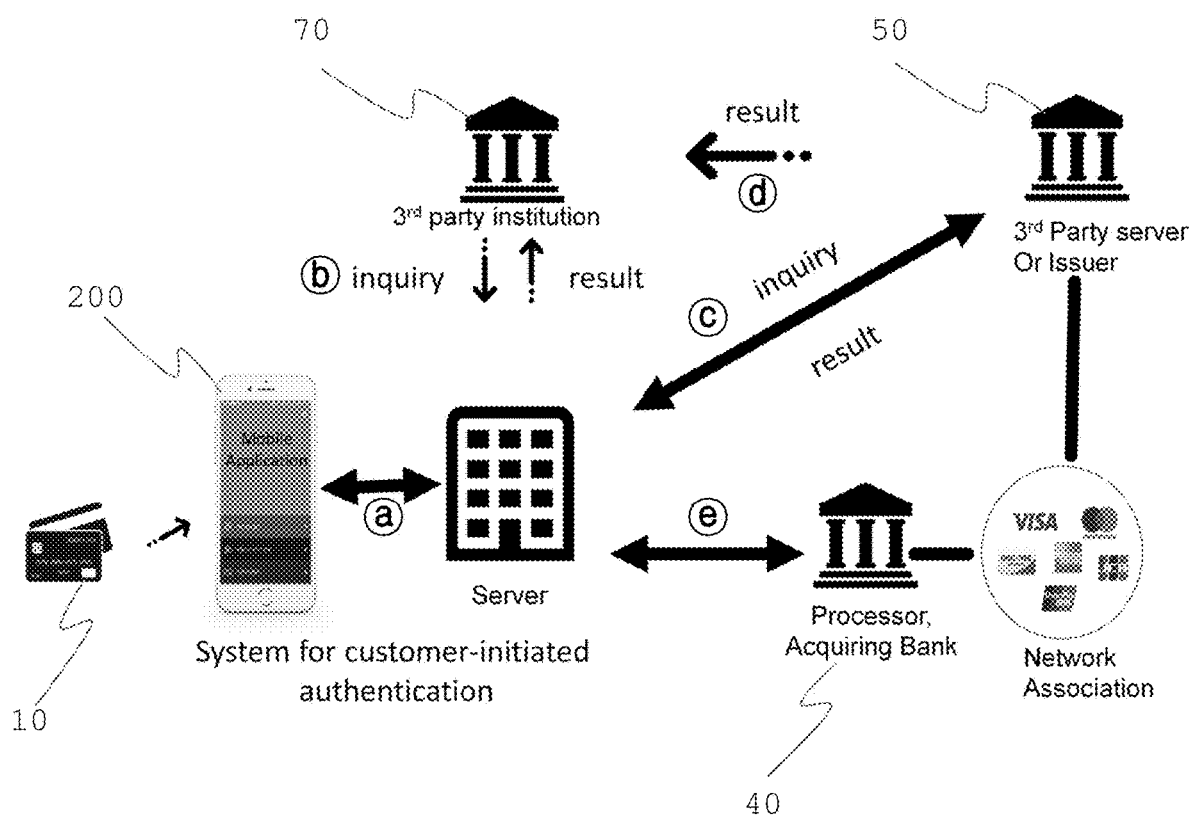
FIG. 30C shows a system for customer-initiated authentication according to the present invention.

FIG. 30C illustrates a system for customer-initiated authentication, including a mobile device 200 of a customer, the mobile device 200 constructed to enable near-field communication (NFC); a mobile application installed and operated in the mobile device 200; a server including authentication information of the customer; and a payment card 10 of the customer having card information wherein the payment card 10 is constructed to enable NFC, wherein the mobile application stored on the mobile device 200 is operative to authenticate the customer which includes the steps of: activating the mobile application, by tapping or positioning the payment card 10 about the mobile device 200 for NFC between the payment card 10 and the mobile device 200, such that the mobile application initiates a process of authenticating the customer; receiving the card information by transferring a chip serial number or a card serial number of the payment card 10 from the payment card 10 to the mobile device 200 via NFC or Bluetooth Light Energy (BLE) communication; and clearing the card information from the mobile device 200 after the processing step. Furthermore, the system is configured to generate an authentication result, and the authentication information stored on the server includes a card information of the payment card 10. The authentication result may include information that confirms the customer authentication if the card information, or any other information used for customer authentication, received by the mobile device matches an authentication information stored elsewhere, such as, without limitation, the authentication information stored on the server, a third-party institution, a third-party server, an acquirer, an issuer, and/or the like as illustrated in FIG. 30C. The authentication result may further include information that denies the customer authentication if the card information, or any other information used for the customer authentication, received by the mobile device does not match the authentication information stored elsewhere, such as, without limitation, the authentication information stored on the server, a third-party institution, a third-party server, an acquirer, an issuer, and/or the like as illustrated in FIG. 30C.

As shown in FIG. 30C, path (b), the system is configured to receive an authentication request from a third-party institution and send the authentication result to the third-party institution. The process of authenticating the customer further includes a step of generating the authentication result by, and after, matching the card information received from the mobile device 200 against the authentication information stored on the server. The card information on the mobile device 200 may be from a customer-initiated zero-amount payment transaction using the mobile application or a nominal cash transaction to an acquirer 40.

Furthermore, also shown in path (b) of FIG. 30C, the process of authenticating the customer further includes: the system receiving from an ID of the customer or a phone number of the customer stored in the third-party institution 70; the system comparing an ID of the customer or a phone number of the system to the ID of the customer or the phone number of the customer received from the third-party institution 70 (e.g. the system comparing an ID of the customer of the system to the ID of the customer received from the third-party institution 70, or comparing a phone number of the system to the phone number of the customer received from the third-party institution 70); and the system generating the authentication result after checking that the ID of the customer or the phone number of the system matches the ID of the customer or the phone number of the customer received from the third-party institution 70 (e.g. the system generating the authentication result after checking that the ID of the customer of the system matches the ID of the customer received from the third-party institution 70, or that the phone number of the system matches the phone number of the customer received from the third-party institution 70).

Alternatively, via path (c) as shown in FIG. 30C, the process of authenticating the customer may further include the steps of the system querying an issuer 50 to send authentication information stored on the issuer 50 to the system; the system receiving from the issuer 50 the authentication information stored on the issuer 50; the system generating the authentication result; and sending the authentication result to the third-party institution 70 via path (b) as shown in FIG. 30C. Here, the authentication information stored on the issuer 50 includes a card information of the payment card 10. Furthermore, the step of generating the authentication result includes the system matching the card information from the mobile device 200 against the authentication information received from the issuer 50.

Alternatively, via path (c) shown in FIG. 30C, the process of authenticating the customer may further include the step of sending the card information received from the mobile device 200 to an issuer 50. Here, the issuer 50 is configured to generate the authentication result by matching the card information received from the mobile device 200 against the authentication information stored on the issuer 50. Furthermore, via path (d) as shown in FIG. 30C, the issuer 50 is configured to send the authentication result generated by the issuer 50 to a third-party institution 70, and the authentication information stored on the issuer 50 includes a card information of the payment card 10. The issuer 50 may be affiliated with a third-party institution 70.

Figure 31A:
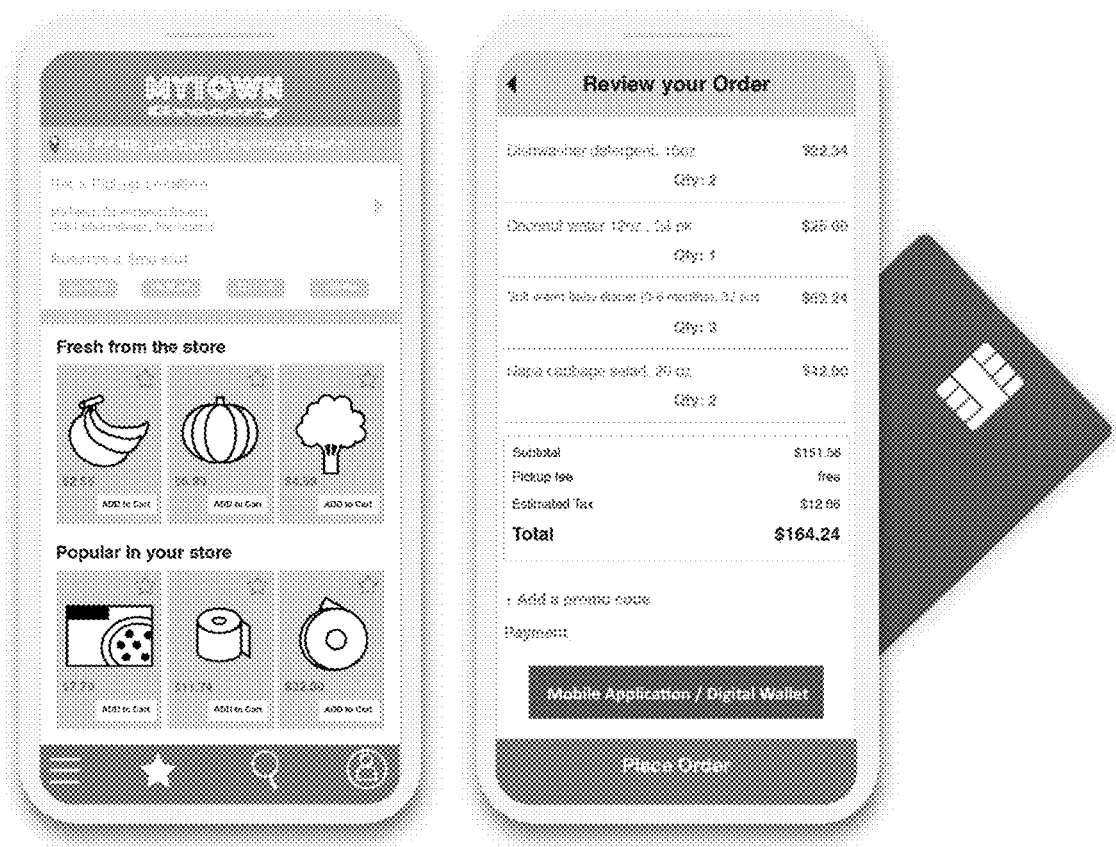
FIGS. 31A-C illustrates the use of a software development kit to permit a mobile device platform according to the present invention to interact with other ecommerce platforms.
Figure 31B:
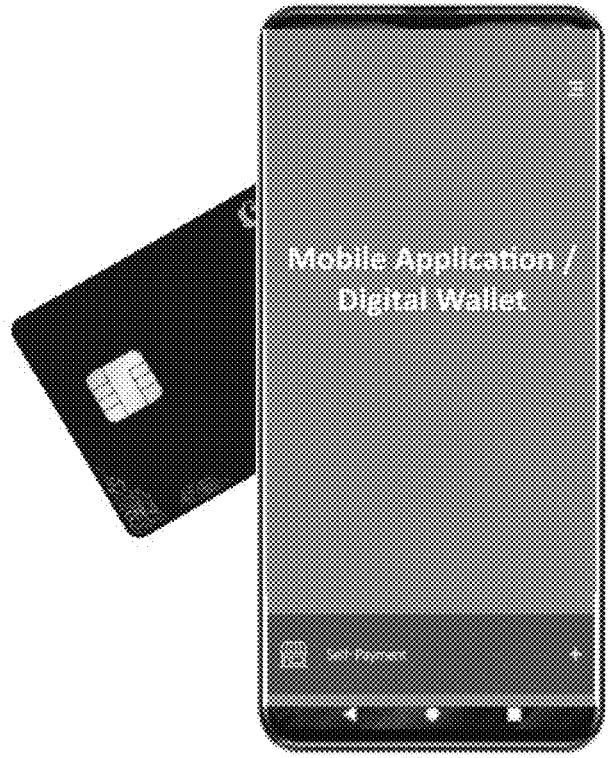
Figure 31C:
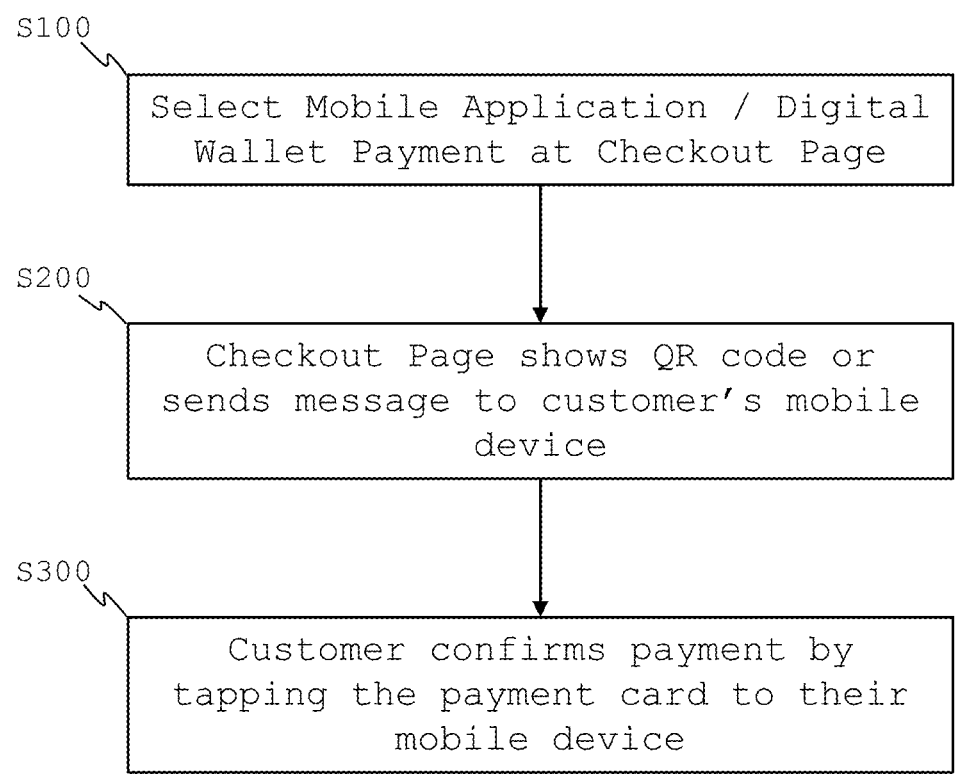

As shown in FIGS. 31A-C, all of the embodiments of the present invention may further include a software development kit (SDK) that can be utilized by other applications stored on the mobile device 200 or other web pages/applications to link or integrate with the mobile platforms of the present invention (e.g. mobile application, digital wallet, and the like). The SDK provides a set of tools, libraries, documentation, code samples, processes, and/or guides that allow other developers to link or integrate features of the mobile platforms of the present invention into their respective platforms, or vice versa. For example, a third-party mobile application shown in FIG. 31A displays a button that links the third-party mobile application to the mobile application/the digital wallet of the present invention through the use of libraries included the SDK. In FIG. 31B, a third-party's payment is shown with a clickable link that directs the rest of the payment transaction to the mobile application/the digital wallet of the present invention, again via the use of the libraries provided by the SDK, to complete the transaction.

FIG. 31C illustrates a scenario where the customer selects the option tied to the mobile platform(s) of the present application at a checkout page of a third-party's platform (S100). For further confirmation, the checkout page displays a QR code or sends a message to the customer's mobile device 200 (e.g. text message, SMS messaging, and the like). The customer chooses the appropriate payment option in the mobile platform of the present invention and confirms payment by tapping the payment card 10 to their mobile device 200. Therefore, the mobile platform(s) of the present invention that are implemented by the SDK, the mobile platform(s) including (but is not limited to) the mobile application, the digital wallet, and the like, provides convenience and flexibility to the customer by allowing purchases to be made across a wide number of retailers and other mobile platforms.

Figure 32A:
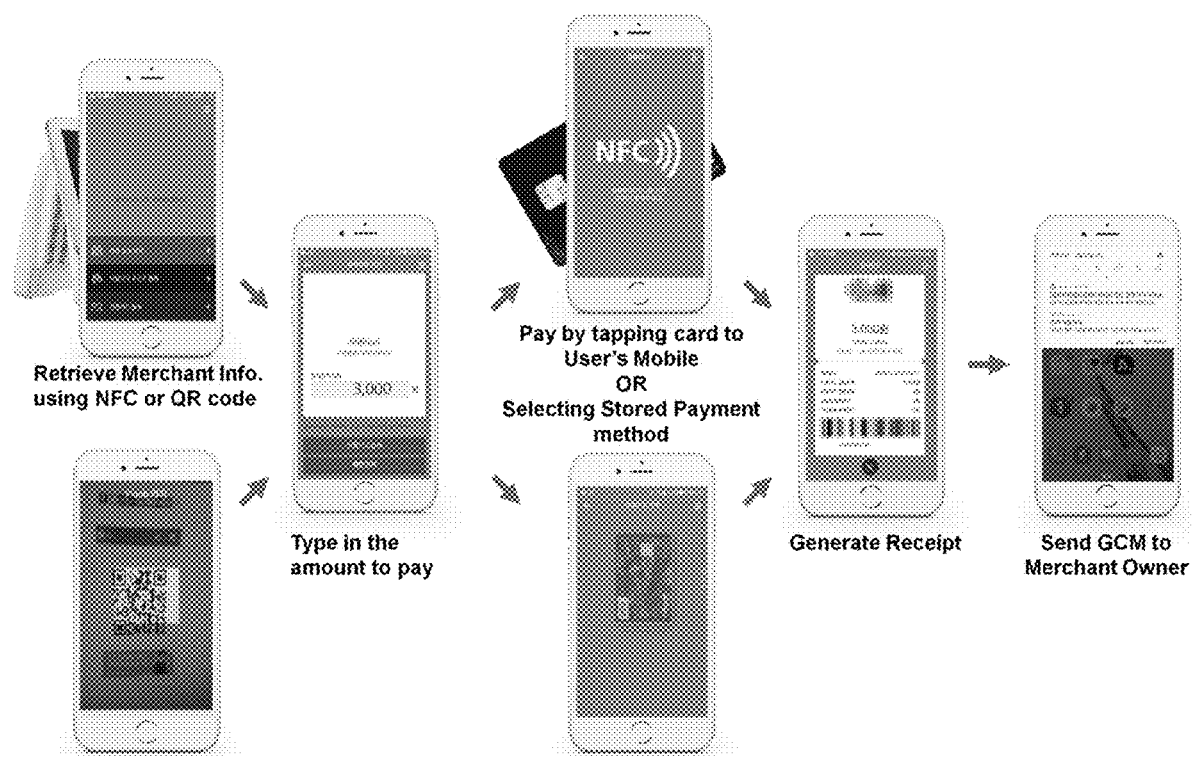
FIGS. 32A-C show processes for retrieving merchant info during a payment transaction via a mobile device platform according to the present invention.
Figure 32B:
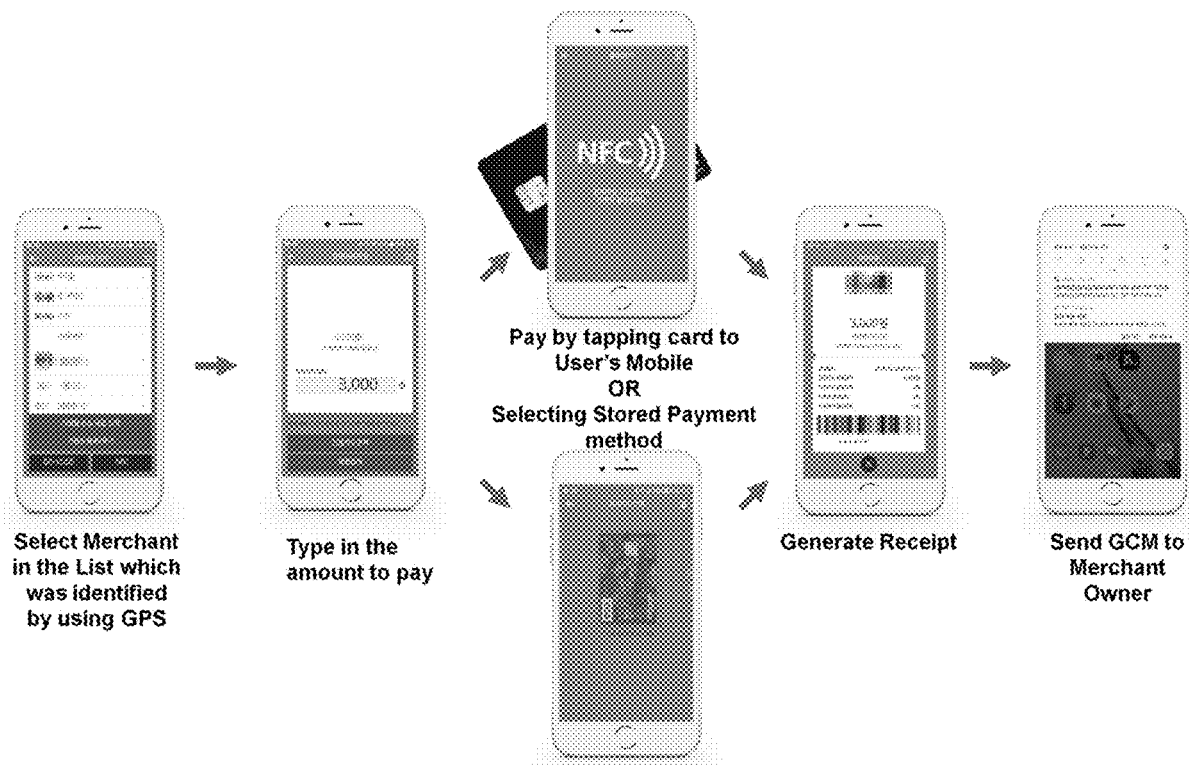
Figure 32C:
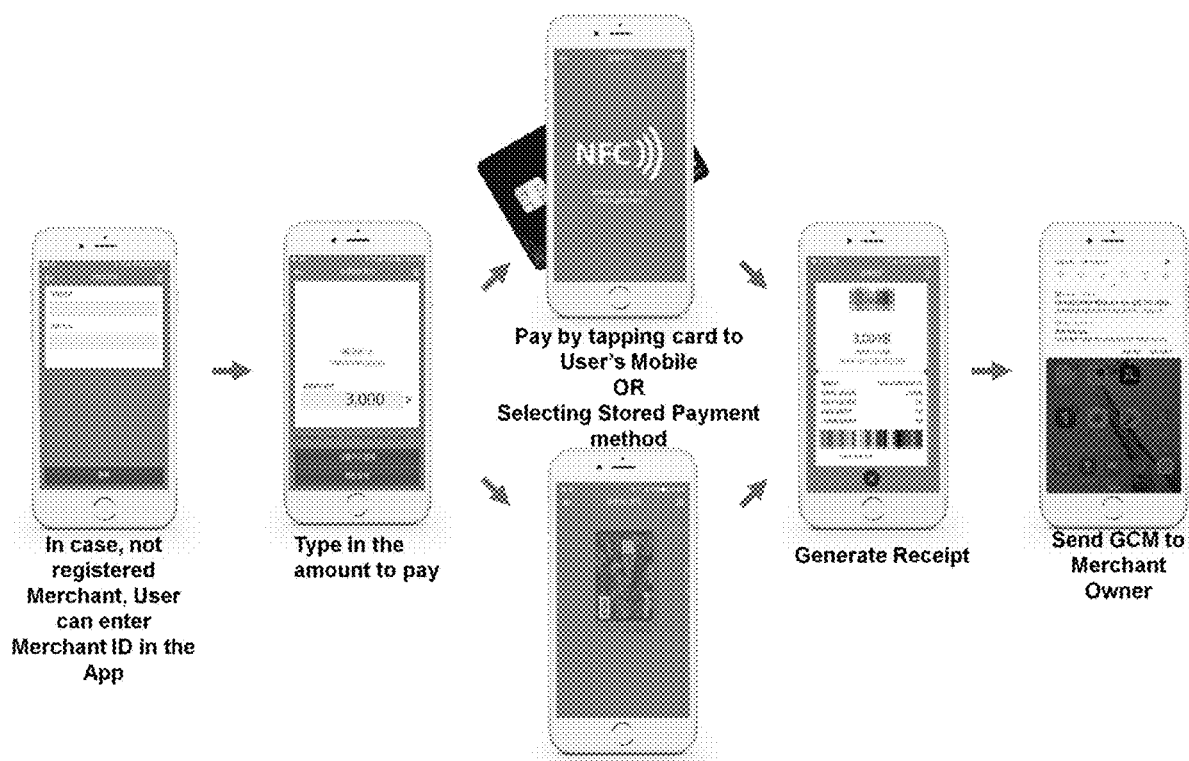

FIGS. 32A-C illustrate different methods for retrieval of the merchant information by the mobile platforms of the present invention. For example, as shown in FIG. 32A, the mobile application or the digital wallet may retrieve the merchant information via NFC or QR code. In another example, FIG. 32B, the merchant information may be retrieved via the global position system as discussed above. In yet another, example, FIG. 32C, if the merchant is not registered, the customer or the merchant may manually enter the merchant ID in the mobile application or the digital wallet. The above examples are illustrative and are not an exhaustive list of the many ways the merchant information may be found or entered in the mobile platforms of the present invention.

Figure 33A:
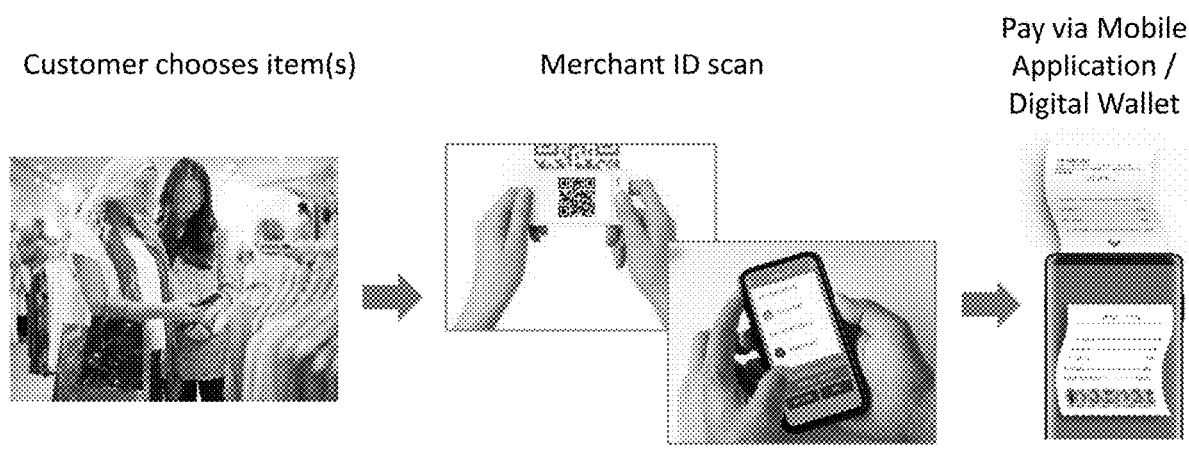

FIGS. 33A-F illustrate different scenarios (again, not an exhaustive list) where embodiments of the present invention may be used. In FIG. 33A, the customer may choose an article on display by the merchant. The article may include a tag having a QR code. This QR code may include the merchant information and may further include the price of the article. The customer can simply use the mobile application/the digital wallet to obtain the merchant information and, possibly, the payment amount of the article via scanning the QR code.

Figure 33B:

In FIG. 33B, the customer chooses an item (e.g. an item on the menu), scans a QR code to obtain the merchant information, enter the payment amount (or having merchant enter the payment amount) using the mobile application/the digital wallet on the customer's mobile device 200, and pay for the time via the mobile application/the digital wallet. In FIG. 33C, the customer checks out an item listed on a web page, scan the QR code presented by the webpage using the camera of the mobile device 200 (the merchant information and, possibly, the payment amount transferred to the mobile application/the digital wallet) and process the payment transaction using the mobile application/the digital wallet.

In FIG. 33D, the customer finds an item using a different mobile device, uses the mobile application/the digital wallet where the merchant information and payment amount may transfer between the different mobile device and the customer's mobile device 200 for the mobile application/the digital wallet to process the payment transaction.

Figure 33E:
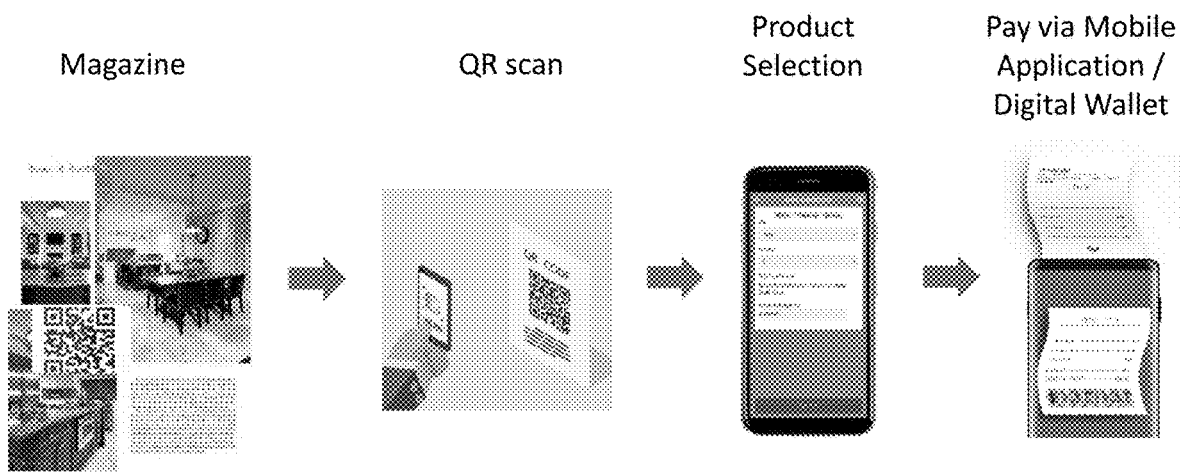
Figure 33F:
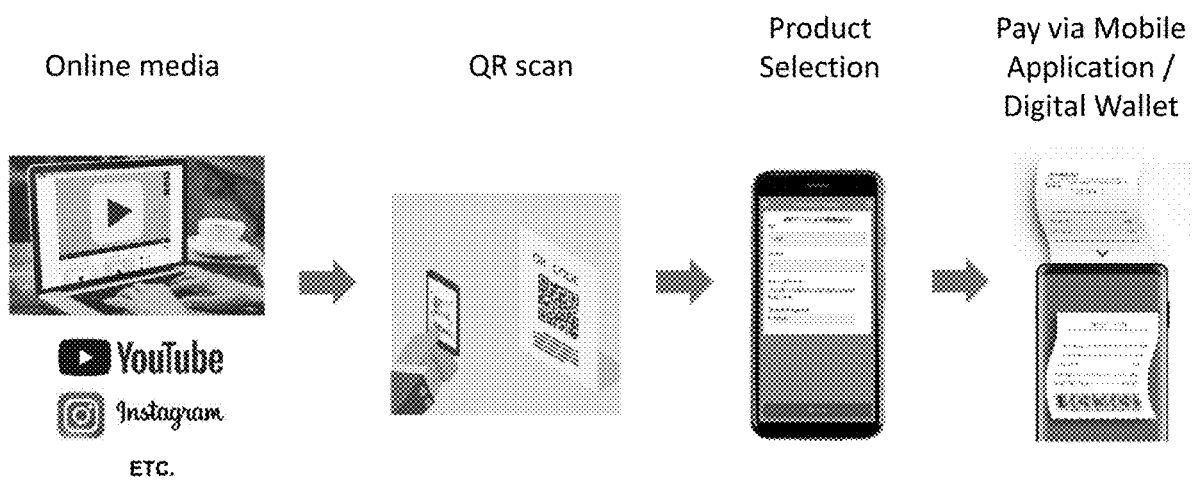

In FIG. 33E, the customer may find an item advertised in a catalog or magazine wherein the catalog or the magazine includes a QR code for the item. The QR code may include the merchant information recognized by the mobile application/the digital wallet. After obtaining the merchant information, the mobile application/the digital wallet may present further options with respect to the item (e.g. color, number the customer wishes to order, product descriptions, quantity the merchant has on hand, shipping dates, etc.). The customer may proceed to make their choices and continue with payment using the mobile application/digital wallet. Likewise for FIG. 33F where the item is presented by online channels such as Youtube, Instagram, and the like. For example, reviewers, bloggers, influencers, and the like may review items and have links and/or QR codes presented to the viewer, the QR codes recognized by the mobile application/the digital wallet of the present invention.

In the above embodiments, the third-party institution may be a security firm/vendor, an issuer, an acquirer, any government agency or ministry, or the like. Furthermore, authentication information stored in any device or stored in any server of any entity listed above may further include, the customer ID; the phone number of the mobile device; a hash of the phone number of the mobile device; payment card identifiers (including, but not limited to, card serial number, chip serial number, a hash of the card serial number or chip serial number, card nickname, a unique card reference number, a hash of the card reference number, card CVV number, a hash of the card CVV number, and the like); mobile device identifiers (including, but not limited to, hardware ID of the mobile device 200, a hash of the hardware ID of the mobile device 200, a unique serial number of the mobile device 200, a hash of the serial number of the mobile device 200, a unique reference number for the mobile device 200, a hash of the reference number for the mobile device 200, and the like); identifiers of the mobile application or the digital wallet 100 (including, but not limited to, ID number of the mobile application or the digital wallet, a hash of the ID number of the mobile application or the digital wallet 100, a unique reference number for the mobile application or the digital wallet 100, a hash of the reference number for the mobile application or the digital wallet 100, and the like); and/or the like. The customer ID may include the customer's name, hash of the name, the customer's legal name, a hash of the customer's legal name, the customer's maiden name, a hash of the customer's maiden name, the customer's nickname, hash of the customer's nickname, the customer's birth date, a hash of the customer's birth date, the customer's e-mail address, a hash of the customer's e-mail address, a reference number for the customer, a hash of the reference number for the customer, a phone number of a secondary mobile device or home phone, a hash of the phone number of the secondary mobile device or home phone, the customer's social security number or like government ID used for verification purposes, a hash of the customer's social security number or the like government ID used for verification purposes, a partial social security number of the customer, a hash of the partial social security number of the customer, biometric data of the customer (including, but not limited to, iris and/or retina scan(s), voice print(s)/template(s), fingerprint scan(s), facial scan(s), physical patterns, and the like), and/or the like.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A system for a customer-initiated payment transaction, comprising:
 a mobile device of a customer, the mobile device including a camera wherein the mobile device is constructed to enable near-field communication (NFC);
 a mobile application installed and operated in the mobile device;
 a quick read (QR) code of a merchant which includes merchant information;
 a server including a database;
 a payment card of the customer having card information wherein the payment card is constructed to enable NFC; and
 a payment information which includes a payment amount,
 wherein the merchant information includes a merchant code,
 wherein the mobile application is configured to use the camera of the mobile device to scan the QR code,
 wherein the payment card stores information on a plurality of different cards,
 wherein the card information includes a chip serial number, wherein the mobile application stored on the mobile device is operative to process a payment transaction which includes the steps of:
receiving the merchant information;
receiving the payment information from the merchant or the customer;
initiating a process of authenticating the customer;
activating the mobile application, by tapping or positioning the payment card about the mobile device for NFC between the payment card and the mobile device, such that the mobile application establishes the mobile device of the customer as a point-of-sale (POS) device to process the payment transaction, wherein the activating step includes the step of receiving the card information from the payment card;
receiving a list of the plurality of the different cards from the payment card and the customer's selecting a card for the payment transaction from the list of the plurality of the different cards,
receiving a card serial number associated with the card selected by the customer;
creating a payment authorization request using the card serial number, the merchant information, and the payment information, and sending the payment authorization request to an acquirer wherein the acquirer settles the payment authorization request with an issuer;
deleting the list of the plurality of the different cards and the card serial number from the mobile device after the mobile application sends the payment authorization request; and
receiving a result of the payment authorization request from the acquirer and/or the issuer,
wherein the step of activating the mobile application further includes the step of transferring a chip serial number or a card serial number of the payment card from the payment card to the mobile device via NFC or Bluetooth Light Energy (BLE) communication such that the mobile application becomes activated and establishes the mobile device as the POS device upon the chip serial number from the payment card matching a chip serial number stored in the mobile device.

2. The system of claim 1, wherein the process of authenticating the customer includes the step that the customer is authenticated when the mobile application becomes activated and establishes the mobile device as the POS device.

3. The system of claim 2, wherein the process of authenticating the customer further includes:
the system receiving from the merchant an identifier for the customer and a phone number of the customer stored in a third party server;
the system comparing the phone number of the mobile device to the phone number of the customer received from the merchant; and
the system allowing the payment transaction to proceed if the phone number of the mobile device matches the phone number of the customer received from the merchant.

4. The system of claim 1, further comprising:
a unique identifier stored in the server, merchant server, or a third party server; and
a local identifier stored in the mobile device,
wherein the unique identifier is at least one of any of the following: phone number of the mobile device, a name of the customer, and an email address of the customer,
wherein the local identifier is at least one of any of the following: phone number of the mobile device, a name of the customer, and an email address of the customer, and
wherein the step of activating the mobile application further includes the system reading the unique identifier and the local identifier such that the mobile application becomes activated and establishes the mobile device as the POS device upon:
the chip serial number or the card serial number from the payment card matching the chip serial number or the card serial number stored in the mobile device; and
the local identifier matching the unique identifier.

5. The system of claim 1, wherein the step of activating the mobile application further includes verifying the payment card via a transaction of a nominal cash amount to the acquirer, and
wherein the process of authenticating the customer further includes password verification and/or biometric verification.

6. The system of claim 1, wherein the process of authenticating the customer includes:
the mobile device sending a phone number of the mobile device to the server and the card serial number to the server;
the server comparing the phone number of the mobile device to a phone number stored on the server and comparing the card serial number to a card information stored on the server; and
the system allowing the payment transaction to proceed if the phone number of the mobile device matches the phone number stored on the server, the card serial number matches the card information stored on the server, and the phone number of the mobile device is associated with the card information in the database.

7. The system of claim 1, wherein the mobile application is configured to:
receive the payment information or the merchant information from manual input, by the customer or the merchant, into the mobile application;
receive the payment information or the merchant information from a text message; and/or
receive the payment information or the merchant information from a system of the merchant.

8. A system for a customer-initiated payment transaction, comprising:
a mobile device of a customer including a camera wherein the mobile device is constructed to enable near-field communication (NFC);
a digital wallet stored and operated in the mobile device;
a multi-payment gateway affiliated with the digital wallet;
a server including a database; and
a payment card of the customer having card information wherein the payment card is constructed to enable NFC, wherein the payment card stores information on a plurality of different cards,
wherein the card information includes a chip serial number,
wherein a customer-initiated payment transaction includes the steps of:
initiating a process to authenticate the customer;
the payment card activating the digital wallet, by tapping or positioning the payment card about the mobile device for NFC between the payment card and the mobile device, such that the digital wallet establishes the mobile device as a point-of-sale device (POS) for processing the customer-initiated payment transaction, wherein the activating step includes the step of receiving the card information from the payment card;

the digital wallet receiving a list of the plurality of the different cards from the payment card, the digital wallet receiving merchant information and payment information from a merchant by the digital wallet communicating with the merchant via one of:
- NFC wherein the merchant provides an NFC tag comprising the merchant information and the payment information; and
- quick read (QR) code scanning by the camera wherein the merchant provides a QR tag comprising the merchant information and the payment information;

the digital wallet receiving a payment method selection, selected from the list of the plurality of the different cards by the customer, from the customer for payment;

the digital wallet generating a payment authorization request based on the merchant information and the payment method selection;

the digital wallet sending the payment authorization request to the multi-payment gateway;

the digital wallet deleting the list of the plurality of the different cards and the payment method selection after sending the payment authorization request;

the multi-payment gateway directly or indirectly communicating to the merchant a result of the customer-initiated payment transaction; and the digital wallet receiving a result of the payment authorization request from the multi-payment gateway, wherein the step of activating the digital wallet further includes the step of transferring the chip serial number, from the payment card to the mobile device via NFC such that the digital wallet is activated if the transferred chip serial number of the card matches a chip serial number of the payment card stored in the mobile device.

9. The system of claim 8, wherein the process of authenticating the customer includes the step that the customer is authenticated when the mobile application becomes activated and establishes the mobile device as the POS device.

10. The system of claim 9, wherein the process of authenticating the customer further includes:
the system receiving from the merchant an identifier for the customer and a phone number of the customer stored in a third party server;
the system comparing the phone number of the mobile device to the phone number of the customer received from the merchant; and
the system allowing the payment transaction to proceed if the phone number of the mobile device matches the phone number of the customer received from the merchant.

11. The system of claim 8, further comprising a unique identifier stored in the server, merchant server, or a third party server; and
a local identifier stored in the mobile device,
wherein the unique identifier is at least one of any of the following: phone number of the mobile device, a name of the customer, and an email address of the customer,
wherein the local identifier is at least one of any of the following: phone number of the mobile device, a name of the customer, and an email address of the customer, and
wherein the step of activating the mobile application further includes the system reading the unique identifier and the local identifier such that the mobile application becomes activated and establishes the mobile device as the POS device upon:
the chip serial number from the payment card matching the chip serial number stored in the mobile device; and
the local identifier matching the unique identifier.

12. The system of claim 8, wherein the step of activating the mobile application includes verifying the payment card via a transaction of a nominal cash amount to the acquirer, and
wherein the process of authenticating the customer further includes password verification and/or biometric verification.

13. The system of claim 8, wherein the process of authenticating the customer includes:
the mobile device sending a phone number of the mobile device to the server and the card information to the server;
the server comparing the phone number of the mobile device to a phone number stored on the server and comparing the card information to a card information stored on the server; and
the system allowing the payment transaction to proceed if the phone number of the mobile device matches the phone number stored on the server, the card information matches the card information stored on the server, and the phone number of the mobile device is associated with the card information in the database.

14. The system of claim 8, wherein the digital wallet is configured to:
receive the payment information or the merchant information from manual input by the customer or the merchant into the digital wallet;
receive the payment information or the merchant information from a text message; and/or
receive the payment information or the merchant information from a system of the merchant.

15. A system for customer-initiated authentication, comprising:
a mobile device of a customer, the mobile device constructed to enable near-field communication (NFC);
a mobile application installed and operated in the mobile device;
a server including authentication information of the customer; and
a payment card of the customer having card information wherein the payment card is constructed to enable NFC,
wherein the payment card stores information on a plurality of different cards,
wherein the mobile application stored on the mobile device is operative to authenticate the customer which includes the steps of:
activating the mobile application, by tapping or positioning the payment card about the mobile device for NFC between the payment card and the mobile device, such that the mobile application initiates a process of authenticating the customer;
receiving the card information by transferring a chip serial number of the payment card from the payment card to the mobile device via NFC or Bluetooth Light Energy (BLE) communication;

receiving a list of the plurality of the different cards from the payment card and the customer's selecting a card for the payment transaction from the list of the plurality of the different cards;

receiving a card serial number associated with the card selected by the customer; and deleting the list of the plurality of the different cards and the card serial number from the mobile device after the processing step, wherein the system is configured to generate an authentication result, and wherein the authentication information stored on the server includes a card information of the payment card.

16. The system of claim 15, wherein the system is configured to receive an authentication request from a third-party institution and send the authentication result to the third-party institution, and wherein the process of authenticating the customer further includes a step of generating the authentication result by, and after, matching the card information received from the mobile device against the authentication information stored on the server.

17. The system of claim 16, wherein the process of authenticating the customer further includes:

the system receiving an ID of the customer or a phone number of the customer from the third-party institution;

the system comparing an ID of the customer or a phone number of the system to the ID of the customer or the phone number of the customer received from the third-party institution; and the system generating the authentication result after checking that the ID of the customer or the phone number of the system matches the ID of the customer or the phone number of the customer received from the third-party institution.

18. The system of claim 16, wherein the process of authenticating the customer further includes steps of:

querying an issuer to send authentication information stored on the issuer to the system;

receiving from the issuer the authentication information stored on the issuer;

generating the authentication result; and sending the authentication result to the third-party institution, wherein the authentication information stored on the issuer includes a card information of the payment card, and wherein the step of generating the authentication result includes the system matching the card information from the mobile device against the authentication information received from the issuer.

19. The system of claim 16, wherein the card information on the mobile device is from a customer-initiated zero-amount payment transaction using the mobile application or a nominal cash transaction to an acquirer.

20. The system of claim 15, wherein the process of authenticating the customer further includes the step of sending the card information received from the mobile device to an issuer, wherein the issuer is configured to generate the authentication result by matching the card information received from the mobile device against the authentication information stored on the issuer, wherein the issuer is configured to send the authentication result generated by the issuer to a third-party institution, and wherein the authentication information stored on the issuer includes a card information of the payment card, and wherein the issuer is affiliated with the third-party institution.

* * * * *